(12) United States Patent
Imae

(10) Patent No.: US 12,472,564 B2
(45) Date of Patent: Nov. 18, 2025

(54) CORE DRILL

(71) Applicant: MAKITA CORPORATION, Anjo (JP)

(72) Inventor: Tomohiko Imae, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/746,120

(22) Filed: Jun. 18, 2024

(65) Prior Publication Data

US 2025/0010380 A1 Jan. 9, 2025

(30) Foreign Application Priority Data

| Jul. 3, 2023 | (JP) | 2023-109190 |
| Jul. 3, 2023 | (JP) | 2023-109203 |
| Jul. 3, 2023 | (JP) | 2023-109204 |

(51) Int. Cl.
*B23B 45/02* (2006.01)
*B23B 45/00* (2006.01)

(52) U.S. Cl.
CPC ............ *B23B 45/008* (2013.01); *B23B 45/02* (2013.01)

(58) Field of Classification Search
CPC .............................. B23B 45/008; B23B 45/02
See application file for complete search history.

(56) References Cited

U.S. PATENT DOCUMENTS

| 10,710,172 | B2 * | 7/2020 | Carlson | B23B 45/00 |
| 11,148,272 | B2 | 10/2021 | Yoshikane et al. | |
| 11,597,068 | B2 | 3/2023 | Yoshikane et al. | |
| 2010/0186978 | A1 * | 7/2010 | Sekino | B25F 5/001 |
| | | | | 173/48 |
| 2015/0328764 | A1 * | 11/2015 | Yoshikane | B25D 16/00 |
| | | | | 173/104 |
| 2018/0099393 | A1 * | 4/2018 | Iida | B25D 17/24 |
| 2019/0232391 | A1 * | 8/2019 | Parendo | B23P 15/32 |
| 2019/0381646 | A1 | 12/2019 | Yoshikane et al. | |
| 2020/0262037 | A1 * | 8/2020 | Schneider | B25B 21/026 |
| 2020/0366161 | A1 * | 11/2020 | Sasaki | H02K 9/227 |
| 2021/0119514 | A1 * | 4/2021 | Cox | H02K 11/0094 |
| 2021/0154808 | A1 * | 5/2021 | Dash | B25B 21/002 |
| 2021/0402584 | A1 | 12/2021 | Yoshikane et al. | |
| 2022/0154534 | A1 | 5/2022 | Schmitz et al. | |
| 2022/0258256 | A1 | 8/2022 | Vidlund et al. | |
| 2023/0173652 | A1 | 6/2023 | Yoshikane et al. | |

OTHER PUBLICATIONS

U.S. Appl. No. 18/746,123, first named inventor: Tomohiko Imae, filed Jun. 18, 2024.

* cited by examiner

*Primary Examiner* — Nathaniel C Chukwurah
(74) *Attorney, Agent, or Firm* — J-TEK LAW PLLC; Jeffrey D. Tekanic; Scott T. Wakeman

(57) ABSTRACT

A core drill includes: a motor having a stator and a rotor, which is rotatable relative to the stator; a speed-reducing mechanism; an output shaft that, in the state in which a core bit is mounted thereon, is rotated by the rotational force of the rotor transmitted via the speed-reducing mechanism; and a battery-mounting part, on which a battery pack is mounted. A stator outer diameter, which is the outer diameter of a stator core of the stator, is 75 mm or more; and a stator length, which is the dimension of the stator core in an axial direction, is 30 mm or more.

20 Claims, 19 Drawing Sheets

FIG.6
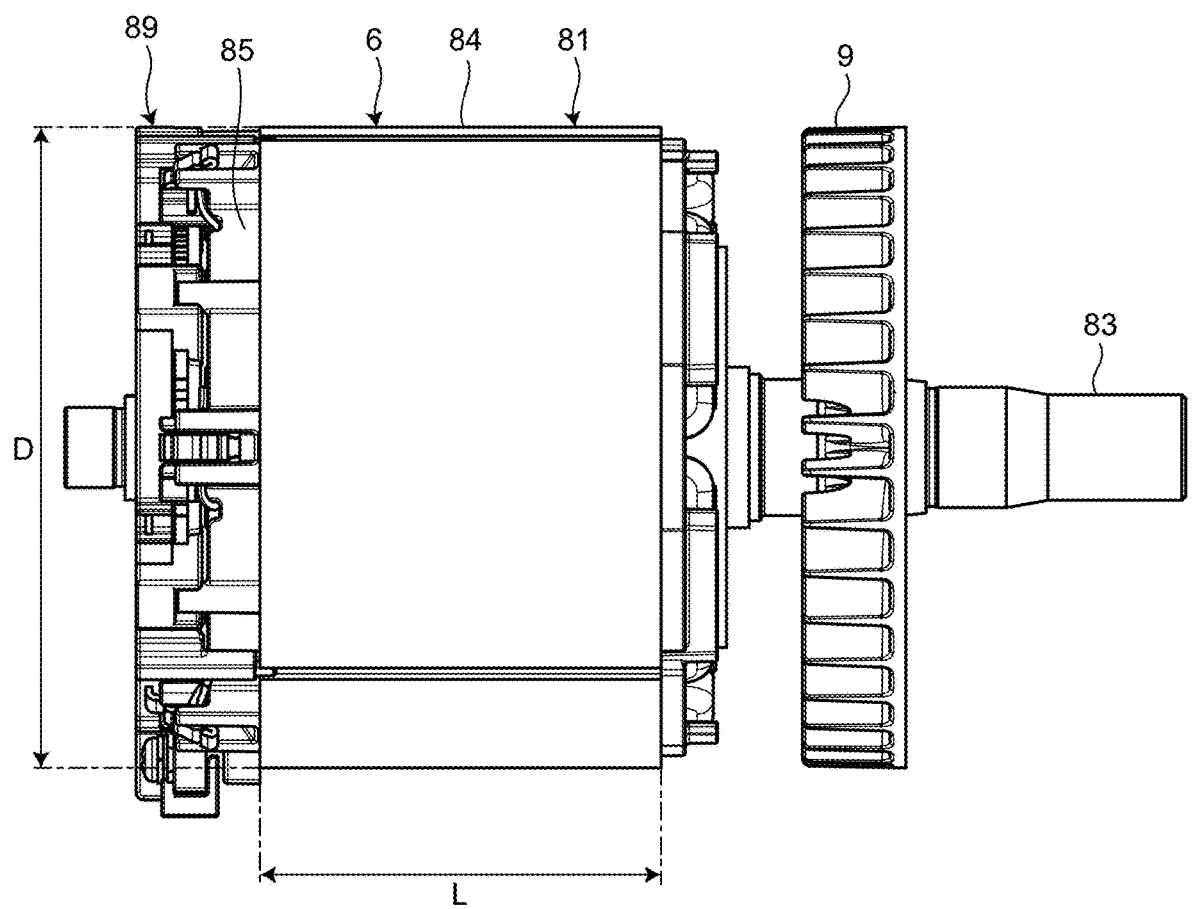
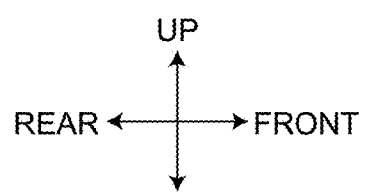

CORE DRILL

CROSS-REFERENCE TO RELATED APPLICATIONS

This application claims priority to Japanese patent application nos. 2023-109190, 2023-109203, and 2023-109204, all filed on Jul. 3, 2023, the contents of all of which are fully incorporated herein by reference.

TECHNICAL FIELD

The techniques disclosed in the present specification relate to a core drill.

BACKGROUND ART

Known core drills are disclosed in U.S. Pat. No. 10,710,172, U.S. Patent Application Publication No. 2022/0154534, and U.S. Patent Application Publication No. 2022/0258256.

SUMMARY OF THE INVENTION

In an embodiment in which the motive power supply of the core drill is a motor, there is demand for the motor to have high output torque. In addition, there is a need to curtail the generation of heat by the motor.

In an embodiment in which the electric-power supply of the core drill is a battery pack, the weight balance of the core drill might worsen depending the configuration of the battery pack.

It is therefore one non-limiting object of the present teachings to disclose techniques for curtailing the generation of heat by the motor while still providing a high torque motor for the core drill.

In addition or in the alternative, it is another non-limiting object of the present teachings to disclose techniques for improving the weight balance of the core drill.

In one aspect of the present teachings, a core drill may comprise: a motor comprising a stator and a rotor, which rotates relative to the stator; a speed-reducing mechanism; an output shaft that, in the state in which a core bit is mounted on the output shaft, is rotated by the rotational force of the rotor transmitted via the speed-reducing mechanism; and a battery-mounting part, on which a battery pack is mounted. A stator outer diameter, which is the outer diameter of a stator core of the stator, may be 75 mm or more. A stator length, which is the dimension of the stator core in an axial direction, may be 30 mm or more.

In another aspect of the present teachings, a core drill may comprise: a motor comprising a stator and a rotor, which rotates relative to the stator; a speed-reducing mechanism; an output shaft that, in the state in which a core bit is mounted on the output shaft, is rotated by the rotational force of the rotor transmitted via the speed-reducing mechanism; a first battery-mounting part, on which a first battery pack is mounted; and a second battery-mounting part, which is connected in series to the first battery-mounting part and on which a second battery pack is mounted. The rated voltage of the first battery pack and the rated voltage of the second battery pack each may be 40 V or more.

According to the techniques disclosed in the present specification, the generation of heat by the motor can be curtailed while still providing a high torque motor for the core drill.

In addition or in the alternative, according to the techniques disclosed in the present specification, the weight balance of the core drill can be improved.

BRIEF DESCRIPTION OF THE DRAWINGS

FIG. 6 is a drawing, viewed from the right, of a motor according to the first embodiment.

DETAILED DESCRIPTION

Figure 1:
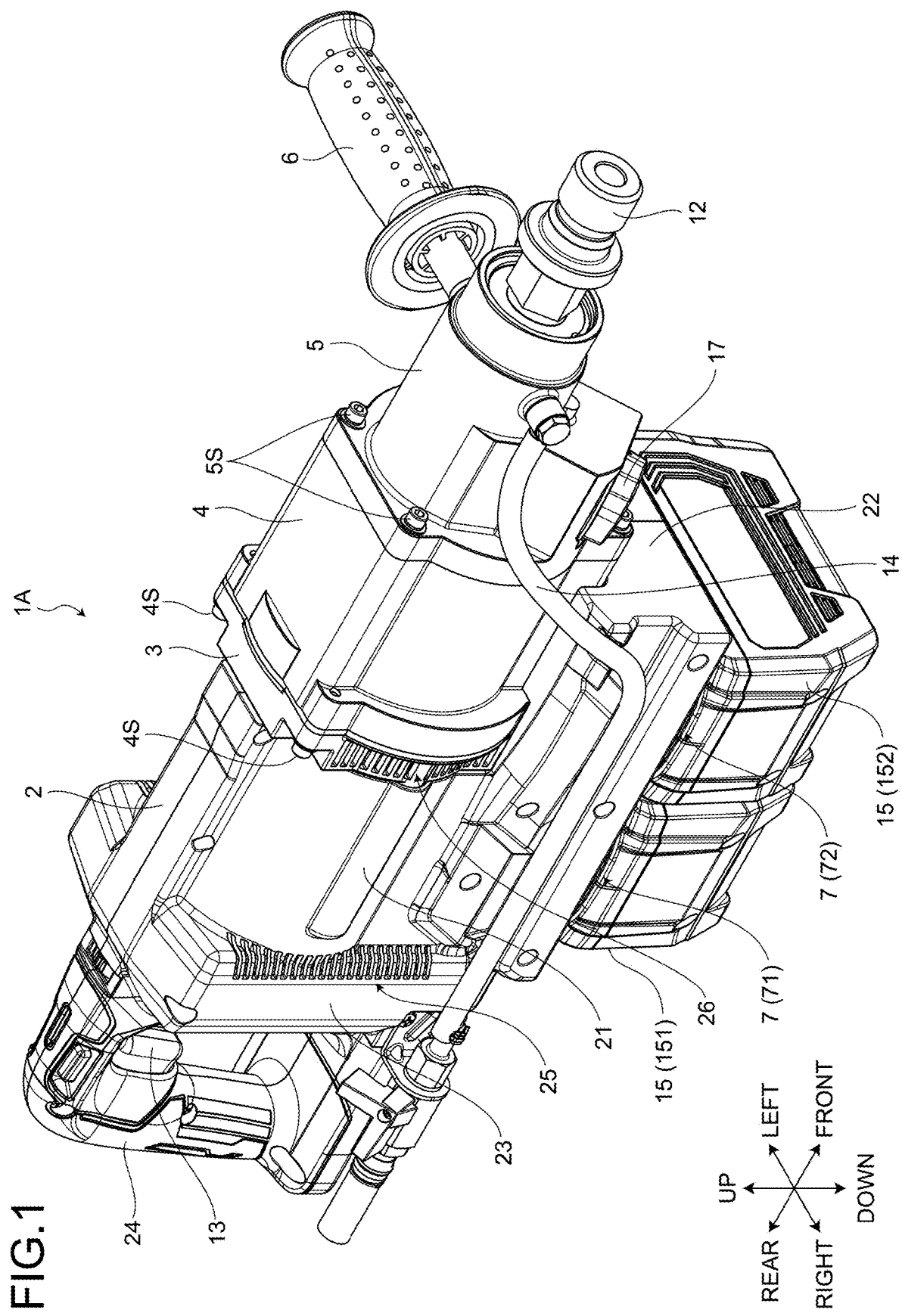
FIG. 1 is an oblique view, viewed from right-upper front, that shows a core drill according to a first embodiment.

As was mentioned above, a core drill may comprise: a motor comprising a stator and a rotor, which rotates relative to the stator; a speed-reducing mechanism; an output shaft that, in the state in which a core bit is mounted, is rotated by the rotational force of the rotor transmitted via the speed-reducing mechanism; and a battery-mounting part, on which a battery pack is mounted. A stator outer diameter, which is the outer diameter of a stator core of the stator, may be 75 mm or more. A stator length, which is the dimension of the stator core in an axial direction, may be 30 mm or more.

In the above-mentioned configuration, the volume of the stator core can be increased, thereby increasing the heat capacity of the stator core. Consequently, the generation of heat by the motor is curtailed. In addition, because the stator outer diameter is large, the motor is capable of generating higher torque.

In one or more embodiments, the stator outer diameter may be 120 mm.

In the above-mentioned configuration, an excessive increase in the size and weight of the motor is prevented. A user can use the core drill by holding it in their hand.

In one or more embodiments, the stator length may be 65 mm or less.

In the above-mentioned configuration, an excessive increase in the size and weight of the motor is prevented. The user can use the core drill by holding it in their hand.

In one or more embodiments, a hole-drilling diameter, which is the outer diameter of a tip portion of the core bit, may be 155 mm or more.

According to the above-mentioned configuration, because the core drill has a high torque motor, a large-diameter hole can be drilled.

In one or more embodiments, the hole-drilling diameter may be 200 mm or less.

In the above-mentioned configuration, an excessive increase in the size and weight of the core bit is prevented. The user can use the core drill by holding it in their hand.

In one or more embodiments, the speed-reduction ratio of the speed-reducing mechanism may be ⅟₁₆ or more and ⅕ or less.

According to the above-mentioned configuration, because the rotational force of the rotor is suitably converted into higher torque, the output shaft can be rotated with a higher torque.

In one or more embodiments, the output power of the motor may be 1,800 W or more and 3,000 W or less.

According to the above-mentioned configuration, a higher-torque motor that reduces electric-power consumption is provided.

In one or more embodiments, the (total) rated voltage of the battery pack(s) attached to the core drill may be 80 V or more.

In the above-mentioned configuration, a high-torque motor can be drive with the high voltage battery pack(s).

In one or more embodiments, the battery-mounting parts may include a first battery-mounting part and a second battery-mounting part, which is (electrically) connected in series to the first battery-mounting part. The rated voltage of the battery pack mounted on the first battery-mounting part and the rated voltage of the battery pack mounted on the second battery-mounting part each may be 40 V or more.

According to the above-mentioned configuration, by using a combination of the battery packs, a high torque motor can be suitably driven while avoiding the need to use an excessively large single battery pack to drive the motor.

In one or more embodiments, a core drill may comprise: a motor comprising a stator and a rotor, which rotates relative to the stator; a speed-reducing mechanism; an output shaft that, in the state in which a core bit is mounted, is rotated by the rotational force of the rotor transmitted via the speed-reducing mechanism; a first battery-mounting part, on which a first battery pack is mounted; and a second battery-mounting part, which is connected in series to the first battery-mounting part and on which a second battery pack is mounted. The rated voltage of the first battery pack and the rated voltage of the second battery pack each may be 40 V or more.

According to the above-mentioned configuration, by using a combination of the battery packs, it is not necessary to use an excessively large single battery pack to drive the motor, and the weight balance of the core drill can be improved. In addition, because the rated voltage of the first battery pack and the rated voltage of the second battery pack each is 40 V or more, a high-torque motor can be adequately drive.

In one or more embodiments, the speed-reducing mechanism may be disposed more forward than the stator. At least a portion of the output shaft may be disposed more forward than the speed-reducing mechanism. The core drill may comprise: a motor-housing part, which houses the motor; and a battery-connection part, which is disposed on the lower side of the motor-housing part. The first battery-mounting part and the second battery-mounting part may be disposed on the battery-connection parts.

According to the above-mentioned configuration, the weight balance of the core drill can be improved.

In one or more embodiments, the speed-reducing mechanism may be disposed more forward than the stator. At least a portion of the output shaft may be disposed more forward than the speed-reducing mechanism. The core drill may comprise: a motor-housing part, which houses the motor; and a battery-connection part, which is disposed on the lower side of the motor-housing part. The first battery-mounting part may be disposed on the battery-connection part, and the second battery-mounting part may be disposed in the motor-housing part.

According to the above-mentioned configuration, the weight balance of the core drill can be improved.

In one or more embodiments, the second battery-mounting part may be disposed at (on) an upper portion of the motor-housing part.

According to the above-mentioned configuration, the weight balance of the core drill can be improved.

In one or more embodiments, the speed-reducing mechanism may be disposed more forward than the stator. At least a portion of the output shaft may be disposed more forward than the speed-reducing mechanism. The core drill may comprise: a motor-housing part, which houses the motor; and a battery-connection part, which is disposed on the lower side of the motor-housing part. Each of the first battery-mounting part and the second battery-mounting part may be disposed on the motor-housing part.

According to the above-mentioned configuration, the weight balance of the core drill can be improved.

In one or more embodiments: the first battery-mounting part may be disposed at (on) a left portion of the motor-housing part; and the second battery-mounting part may be disposed at (on) a right portion of the motor-housing part.

According to the above-mentioned configuration, the weight balance of the core drill can be improved.

In one or more embodiments, the speed-reducing mechanism may be disposed more forward than the stator. At least a portion of the output shaft may be disposed more forward than the speed-reducing mechanism. The core drill may comprise: a motor-housing part, which houses the motor; a controller, which is disposed more rearward than the motor and which controls (energizes) the motor; and a controller-housing part, which is disposed on the rear side of the motor-housing part and houses the controller. The first battery-mounting part may be disposed on the controller-housing part; and the second battery-mounting part may be disposed on the motor-housing part.

According to the above-mentioned configuration, the weight balance of the core drill can be improved.

Embodiments according to the present disclosure are explained below, with reference to the drawings, but the present disclosure is not limited to the embodiments. Structural elements of the embodiments explained below can be combined where appropriate. In addition, there are also situations in which some of the structural elements are not used.

In the embodiments, positional relationships among parts are explained using the terms "left," "right," "front," "rear," "up," and "down." These terms indicate relative positions or directions, with the center of a core drill as the reference. A left-right direction, a front-rear direction, and an up-down direction are all mutually orthogonal.

First Embodiment

A first embodiment will now be explained.
Core Drill

Figure 2:
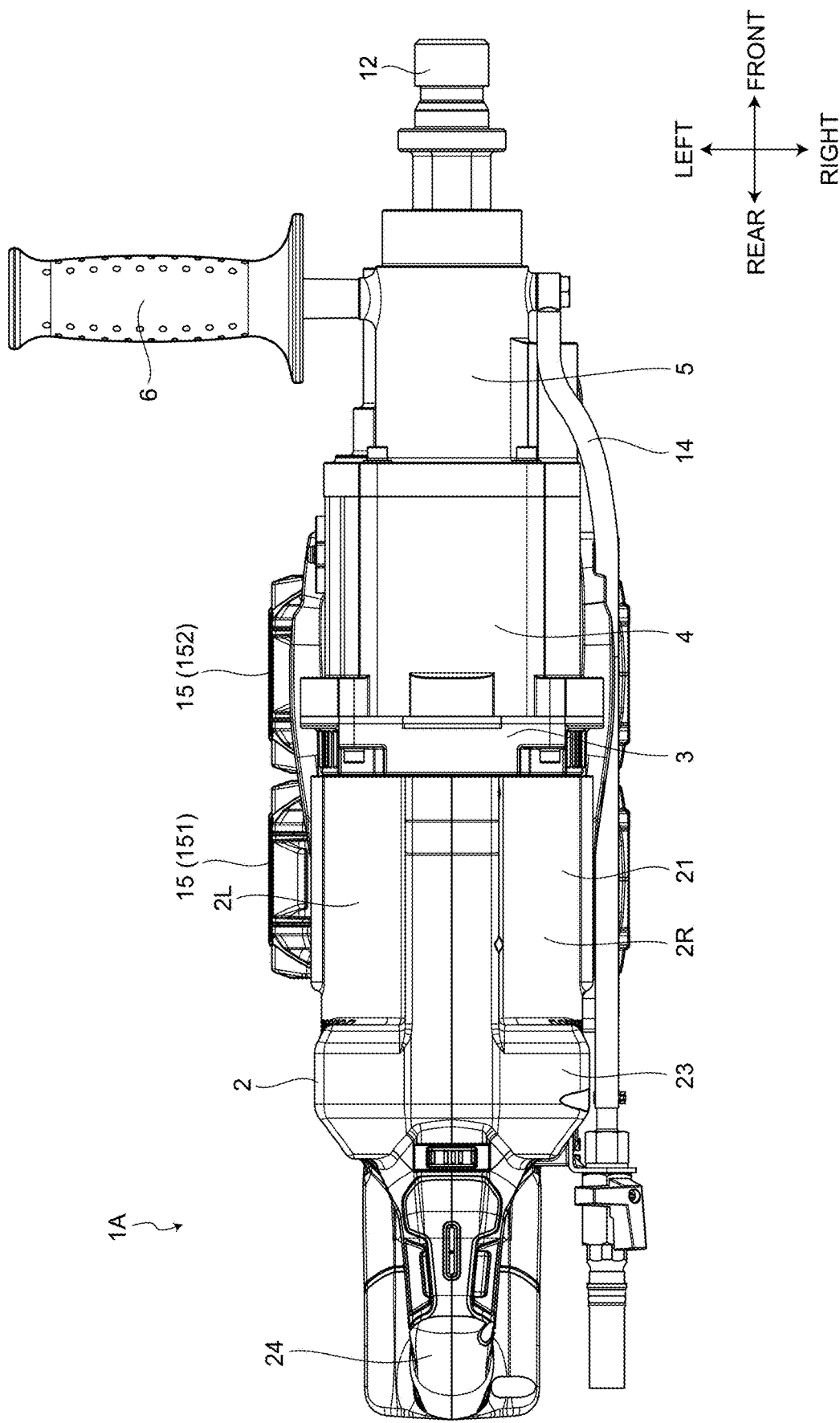
FIG. 2 is a drawing, viewed from above, of the core drill according to the first embodiment.
Figure 3:
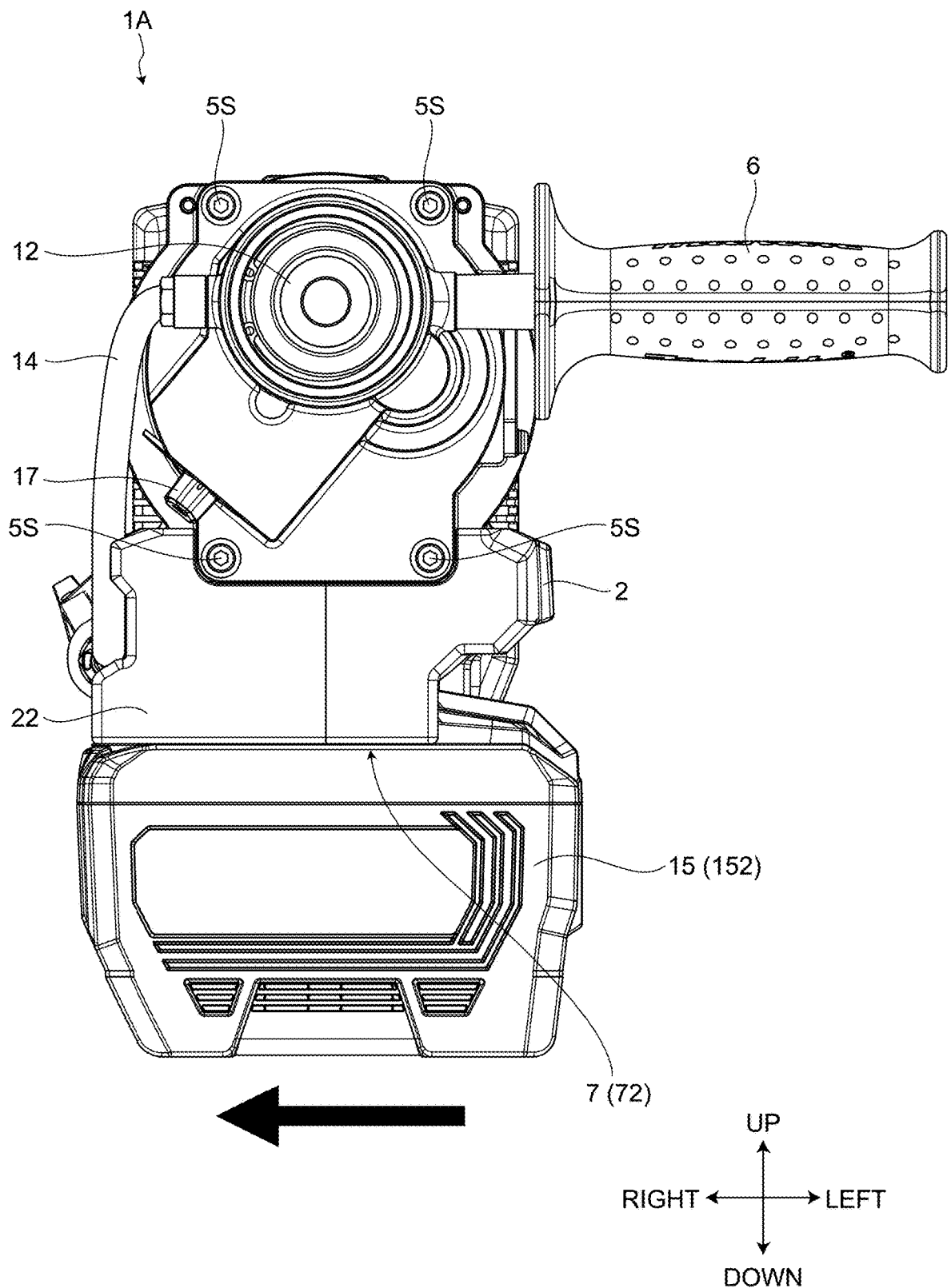
FIG. 3 is a drawing, viewed from the front, of the core drill according to the first embodiment.
Figure 4:
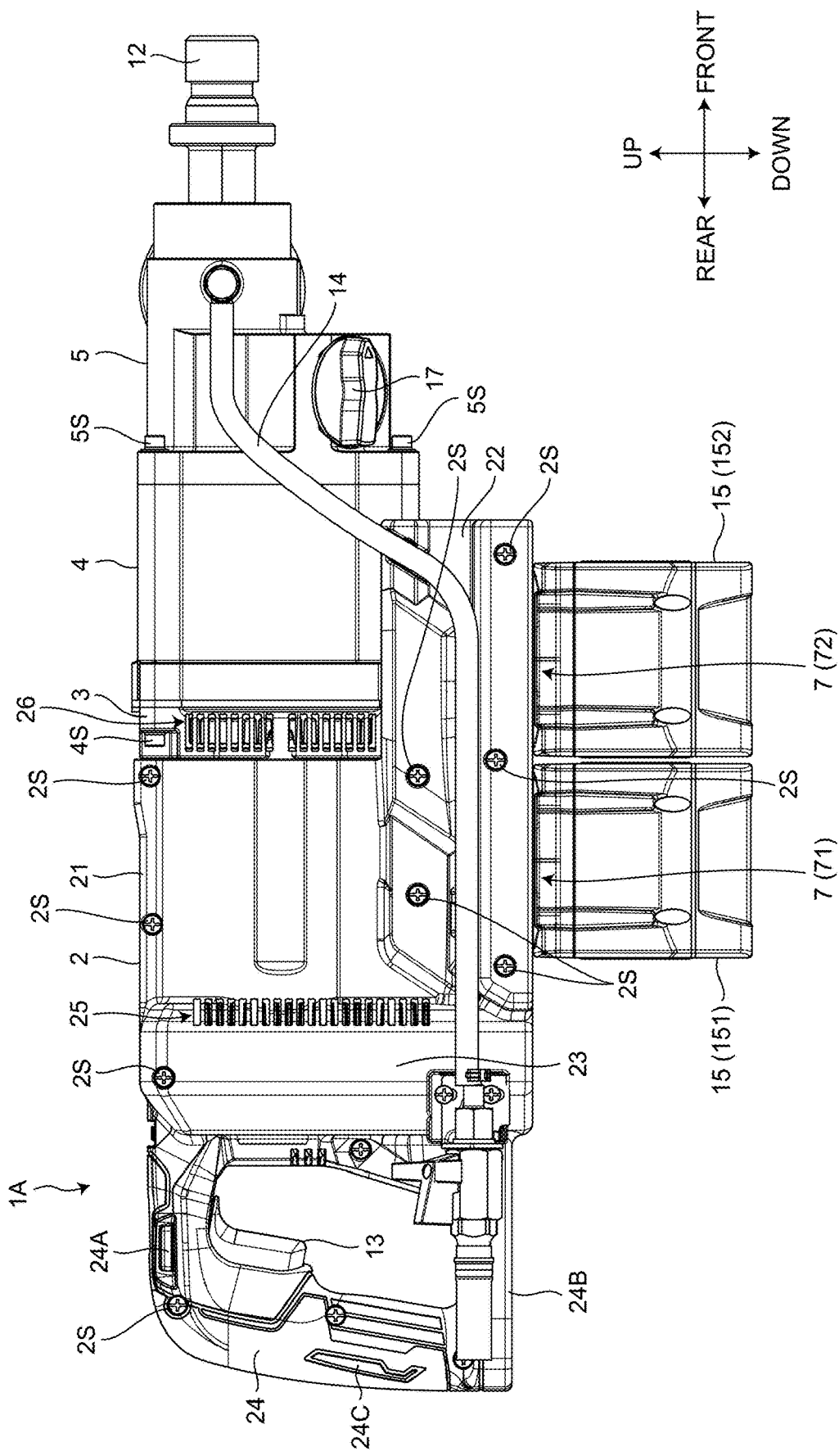
FIG. 4 is a drawing, viewed from the right, of the core drill according to the first embodiment.
Figure 5:
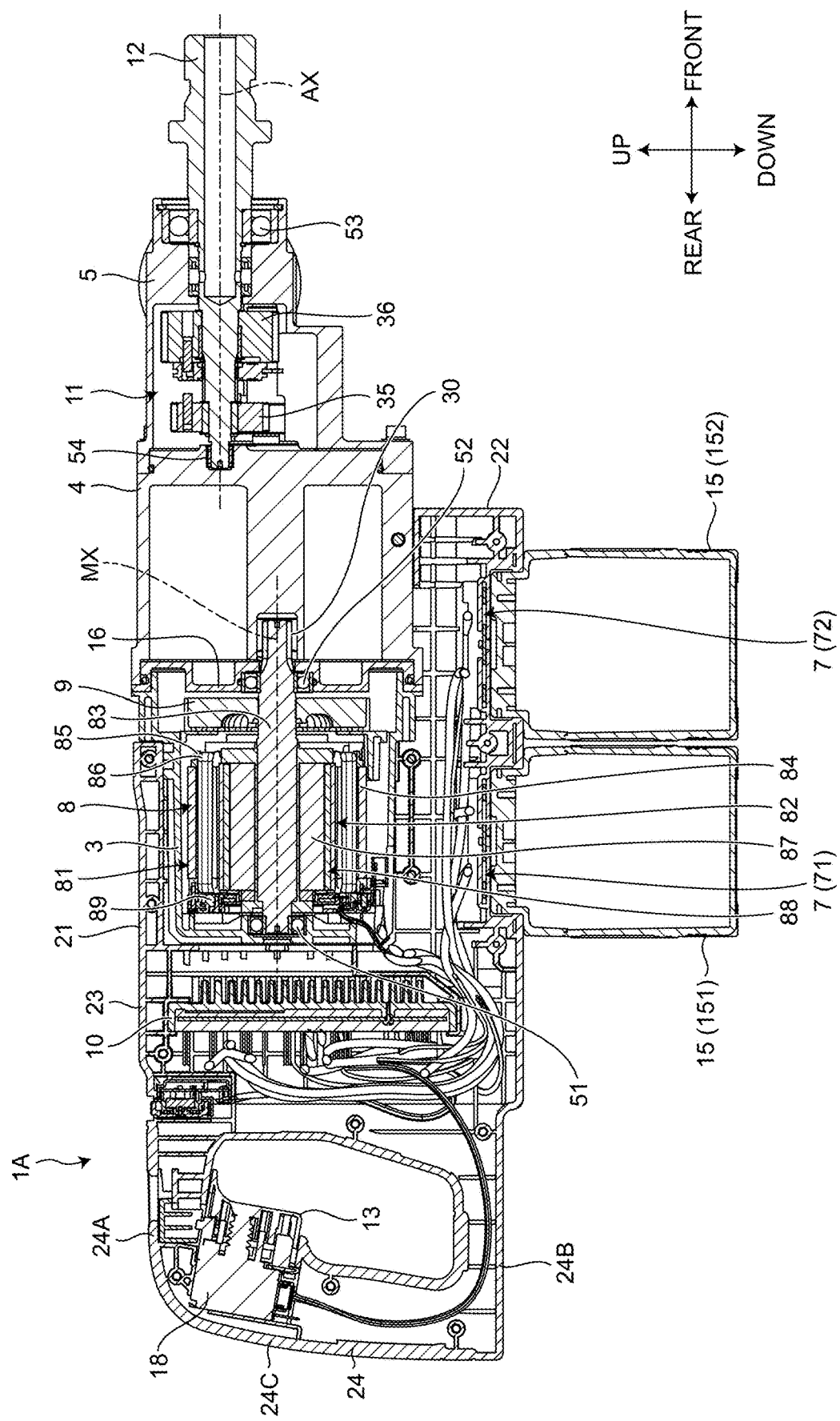
FIG. 5 is a cross-sectional view that shows the core drill according to the first embodiment.

FIG. 1 is an oblique view, viewed from the right-upper front, that shows a core drill 1A according to the present embodiment. FIG. 2 is a drawing, viewed from above, of the core drill 1A according to the present embodiment. FIG. 3 is a drawing, viewed from the front, of the core drill 1A according to the present embodiment. FIG. 4 is a drawing, viewed from the right, of the core drill 1A according to the present embodiment. FIG. 5 is a cross-sectional view that shows the core drill 1A according to the present embodiment.

In the present embodiment, the core drill 1A is a rechargeable core drill that may be utilized to rotatably drive, e.g., a diamond or carbide core bit.

The core drill 1A comprises a main-body housing 2, a motor case 3, a gear case 4, a gear housing 5, a side handle 6, two battery-mounting parts 7, a motor 8, a fan 9, a controller 10, a speed-reducing mechanism 11, a spindle 12, a trigger lever (trigger or trigger switch) 13, and a water-supply tube 14.

The main-body housing 2 is made of a synthetic resin (polymer), such as nylon (polyamide). The main-body housing 2 includes a left main-body housing 2L and a right main-body housing 2R. The right main-body housing 2R is disposed on the rightward side of the left main-body housing 2L. The left main-body housing 2L and the right main-body housing 2R constitute a pair of half housings. The left main-body housing 2L and the right main-body housing 2R are fixed to each other by a plurality of screws 2S.

The main-body housing 2 comprises a motor-housing part 21, a battery-connection part 22, a controller-housing part 23, and a grip part 24.

The motor-housing part 21 houses the motor case 3. The motor case 3 houses the motor 8. The motor-housing part 21 houses the motor 8 via the motor case 3.

The battery-connection part 22 holds (supports, defines) the two battery-mounting parts 7. The battery-connection part 22 is disposed on the lower side of the motor-housing part 21.

The controller-housing part 23 houses the controller 10. The controller-housing part 23 is disposed on the rear side of the motor-housing part 21.

The grip part 24 is gripped by the user. The grip part 24 is disposed more rearward than the motor-housing part 21. The grip part 24 is disposed on the rear side of the controller-housing part 23. In the front-rear direction, the controller-housing part 23 is disposed between the motor-housing part 21 and the grip part 24.

The grip part 24 comprises: an upper-grip part 24A, which extends rearward from an upper portion of the controller-housing part 23; a lower-grip part 24B, which extends rearward from a lower portion of the controller-housing part 23; and a rear-grip part 24C, which connects a rear portion of the upper-grip part 24A and a rear portion of the lower-grip part 24B. The trigger lever 13 is disposed at an upper portion of the rear-grip part 24C.

The gear case 4 houses at least a portion of the speed-reducing mechanism 11. The gear case 4 is connected to a front portion of the motor-housing part 21. A front portion of the motor case 3 is disposed between a front portion of the motor-housing part 21 and a rear portion of the gear case 4. The gear case 4 is connected to a front portion of the motor-housing part 21 via the motor case 3. The front portion of the motor case 3 and the rear portion of the gear case 4 are fixed to each other by a plurality of screws 4S.

The gear housing 5 houses at least a portion of the speed-reducing mechanism 11. The gear housing 5 houses the spindle 12. The gear housing 5 is connected to a front portion of the gear case 4. The front portion of the gear case 4 and the rear portion of the gear housing 5 are fixed to each other by a plurality of screws 5S.

The side (auxiliary) handle 6 is configured to be gripped by the user. The side handle 6 is fixed to the left side of the gear housing 5. The side handle 6 protrudes leftward from a left portion of the gear housing 5.

The two battery-mounting parts 7 respectively hold two battery packs 15. The battery-mounting parts 7 are disposed at lower portions of the battery-connection part 22. Each of the battery-mounting parts 7 includes a terminal block, which is electrically connectable to (with) the corresponding battery pack 15. The battery packs 15 are respectively mounted on the battery-mounting parts 7. The battery packs 15 are detachable from the battery-mounting parts 7.

In the present embodiment, the two battery-mounting parts 7 include a first battery-mounting part 71 and a second battery-mounting part 72. The structure and the size of the terminal block of the first battery-mounting part 71 are preferably the same as the structure and the size of the terminal block of the second battery-mounting part 72, but the terminal blocks may be configured differently to mount different types of battery packs in other embodiments of the present teachings. The first battery-mounting part 71 and the second battery-mounting part 72 are preferably connected in series, but may instead be connected in parallel in other embodiments of the present teachings.

The first battery-mounting part 71 and the second battery-mounting part 72 are disposed such that they are adjacent to each other in the front-rear direction. The first battery-mounting part 71 is disposed rearward of the second battery-mounting part 72. The battery packs 15 include a first battery pack 151, which is mounted on the first battery-mounting part 71, and a second battery pack 152, which is mounted on the second battery-mounting part 72.

The battery packs 15 are mounted on the battery-mounting parts 7 by being slid rightward from the left side of the battery-mounting parts 7, as indicated by the arrow in FIG. 3. Thus, the battery packs 15 are mounted on the battery-mounting parts 7 by sliding.

More specifically, the first battery pack 151 is mounted on the first battery-mounting part 71 by sliding the first battery pack 151 rightward from the left side of the first battery-mounting part 71. The first battery-mounting part 71 comprises terminals. By mounting the first battery pack 151 on the first battery-mounting part 71, connection terminals of the first battery pack 151 and the terminals of the first battery-mounting part 71 are electrically connected to each other. The first battery pack 151 is removed from the first battery-mounting part 71 by sliding the first battery pack 151 leftward from the first battery-mounting part 71. That is, the first battery pack 151 is detachable from the first battery-mounting part 71 in this manner.

The second battery pack 152 is mounted on the second battery-mounting part 72 by sliding the second battery pack 152 rightward from the left side of the second battery-mounting part 72. The second battery-mounting part 72 comprises terminals. By mounting the second battery pack 152 on the second battery-mounting part 72, connection terminals of the second battery pack 152 and the terminals of the second battery-mounting part 72 are electrically connected to each other. The second battery pack 152 is removed from the second battery-mounting part 72 by sliding the second battery pack 152 leftward from the second battery-mounting part 72. That is, the second battery pack 152 is detachable from the second battery-mounting part 72 in this manner.

The battery packs 15 function as the electric-power supply of the core drill 1A. Each of the battery packs 15 comprises a secondary battery. In the present embodiment, each of the battery packs 15 comprises a rechargeable lithium-ion battery, preferably a plurality of lithium-ion battery cells although other types of battery chemistry, such as solid state batteries, may be effectively utilized with the present teachings. When mounted on the battery-mounting parts 7, the battery packs 15 can supply electric power to the core drill 1A. The first battery pack 151 and the second battery pack 152 are connected in series when mounted on the first and second battery-mounting parts 71, 72. The motor 8 is driven (energized) by the electric power supplied from both the first battery pack 151 and the second battery pack 152. The controller 10 also operates using the electric power supplied from both the first battery pack 151 and the second battery pack 152.

The motor 8 functions as the motive power supply of the core drill 1A. The motor 8 is preferably an inner-rotor-type DC brushless motor, although other types of motors may be effectively utilized with the present teachings such as an outer-rotor-type motor. The motor 8 is housed in the motor case 3. The motor case 3 is housed in the motor-housing part 21 of the main-body housing 2. Thus, the motor 8 is housed in the motor-housing part 21 via the motor case 3.

FIG. 6 is a drawing, viewed from the right, of the motor 8 according to the present embodiment. As shown in FIGS. 5 and 6, the motor 8 comprises a stator 81, a rotor 82, and a rotor shaft 83. The stator 81 is fixed to the motor case 3 in a non-rotatable manner; i.e. the stator 81 is fixedly held by the motor case 3 such that the stator 81 cannot rotate relative to the motor case 3. At least a portion of the rotor 82 is disposed in the interior of the stator 81. The rotor shaft 83 is fixed to the rotor 82. The rotor 82 rotates relative to the stator 81 about motor rotational axis MX, which extends in the front-rear direction.

The stator 81 comprises: a stator core 84, which comprises a circular-ring-shaped yoke and a plurality of teeth protruding radially inward from an inner-circumferential surface of the yoke; insulators 85, which are fixed to the stator core 84; and a plurality of coils 86 wound around the plurality of teeth of the stator core 84 via the insulators 85. The coils 86 are connected to each other via a busbar (short-circuiting) unit 89.

The rotor 82 rotates about motor rotational axis MX. The rotor 82 comprises a rotor core 87 and rotor magnets 88, which are fixed to the rotor core 87.

A sensor board, which is not shown, is fixed to one of the insulators 85. The sensor board supports (holds) rotation-detection devices, which detect the position of the rotor 82 in the rotational direction. The rotation-detection devices detect the position of the rotor 82 in the rotational direction by detecting the positions of the rotor magnets 88 as the rotor 82 rotates.

The rotor shaft 83 is fixed to the rotor core 87. The rotor 82 and the rotor shaft 83 rotate together about motor rotational axis MX.

The rotor shaft 83 is supported by both a rotor bearing 51 and a rotor bearing 52 in a rotatable manner. The rotor bearing 51 supports, in a rotatable manner, a rear portion of the rotor shaft 83, which protrudes more rearward than a rear-end surface of the rotor 82. The rotor bearing 52 supports, in a rotatable manner, a front portion of the rotor shaft 83, which protrudes more forward than a front-end surface of the rotor 82. The rotor bearing 51 is held on the motor case 3. The rotor bearing 52 is held by a motor bracket 16, which is fixed to a rear portion of the gear case 4.

The fan 9 generates an airflow for cooling the motor 8 and the controller 10. The fan 9 is disposed forward of the stator 81. The fan 9 is fixed to a front portion of the rotor shaft 83. The fan 9 is disposed between the stator 81 and the rotor bearing 52. The fan 9 and the rotor shaft 83 rotate together.

Air-intake ports 25 are provided in both a left portion and a right portion of the controller-housing part 23 and extend perpendicular, or at least substantially perpendicular, to motor rotational axis MX. Air-exhaust ports 26 are provided in both a left portion and a right portion of a front portion of the motor case 3 and extend perpendicular, or at least substantially perpendicular, to motor rotational axis MX. In response to the rotation of the fan 9, air outside of the main-body housing 2 flows into the interior space of the controller-housing part 23 via the air-intake ports 25. The air that has flowed into the interior space of the controller-housing part 23 flows through the interior space of the controller-housing part 23, thereby cooling the controller 10. The air that has flowed through the interior space of the controller-housing part 23 flows, owing to the rotation of the fan 9, into the interior space of the motor case 3 via one or more vents, which is (are) provided in a rear portion of the motor case 3. The air that has flowed into the interior space of the motor case 3 flows through the interior space of the motor case 3, thereby cooling the motor 8. At least a portion of the air that has flowed through the interior space of the motor case 3 flows out to the exterior of the motor case 3 via the air-exhaust ports 26 owing to the rotation of the fan 9. Stated in another manner, the airflow path from the air-intake ports 25 to the air-exhaust ports 26 includes a first portion that extends from air-intake ports 25 perpendicular, or at least substantially perpendicular, to motor rotational axis MX, a second portion that extend parallel to motor rotational axis MX through the interior of motor case 3 and a third portion that extends from interior of the motor case 3 perpendicular, or at least substantially perpendicular, to and through the air-exhaust ports 26.

The controller 10 outputs control signals, which control the motor 8. The controller 10 comprises a circuit board, on which a plurality of electronic parts is installed. Illustrative examples of the electronic parts installed on the circuit board include: a processor, such as a CPU (central processing unit); nonvolatile memory, such as ROM (read-only memory) and storage; volatile memory, such as RAM (random-access memory), field-effect transistors (FETs: field-effect transistors); and resistors. The controller 10 is housed in the controller-housing part 23.

The controller 10 is disposed more rearward than the motor 8. At least a portion of the controller 10 is disposed along the extension of motor rotational axis MX. That is, at least a portion of the controller 10 and motor rotational axis MX are disposed at the same location in both the up-down direction and the left-right direction. Preferably, the circuit board of the controller 10 defines a plane that extends perpendicular to motor rotational axis MX such that the air-intake ports 25 extend parallel to the plane of the circuit board. In addition, a plurality of power field effect transistors (FETs) is disposed on the circuit board. The power FETs are configured to conduct drive currents from the battery pack to the motor. Because such drive currents may be 20 amperes or greater, the power FETs may generate significant amounts of heat during operation and thus effective cooling for the circuit board is necessary to avoid overheating.

The grip part 24 is disposed more rearward than the controller 10. At least a portion of the grip part 24 is disposed more rearward than the motor-housing part 21 along the extension of motor rotational axis MX. That is, at least a portion of the grip part 24 and motor rotational axis MX are disposed at the same location in both the up-down direction and the left-right direction. In the present embodiment, at least a portion of the rear-grip part 24C and motor rotational axis MX are disposed at the same location in both the up-down direction and the left-right direction. In the present embodiment, at least a portion of the trigger lever 13 and motor rotational axis MX are disposed at the same location in both the up-down direction and the left-right direction. In other words, motor rotational axis MX intersects the grip part 24, preferably the rear-grip part 24C and optionally also the trigger lever 13.

In the front-rear direction, at least a portion of the controller 10 is disposed between the motor 8 and the grip part 24.

The speed-reducing mechanism 11 transmits the rotational force of the motor 8 to the spindle 12. That is, the speed-reducing mechanism 11 mechanically couples the rotor shaft 83 and the spindle 12 to each other. The speed-reducing mechanism 11 is configured to rotate the spindle 12 at a rotational speed that is lower than the rotational speed of the rotor shaft 83, but at a higher torque. The output rotational speed of the speed-reducing mechanism 11 is less than the rotational speed of the rotor 82 (i.e. the input rotational speed of the speed-reducing mechanism 11) by a prescribed speed-reduction ratio. The speed-reducing mechanism 11 is disposed more forward than the stator 81.

A gear (preferably, a pinion gear) 30 is fixed to a front-end portion of the rotor shaft 83. The rotor shaft 83 is coupled to the speed-reducing mechanism 11 via the gear 30.

Figure 7:
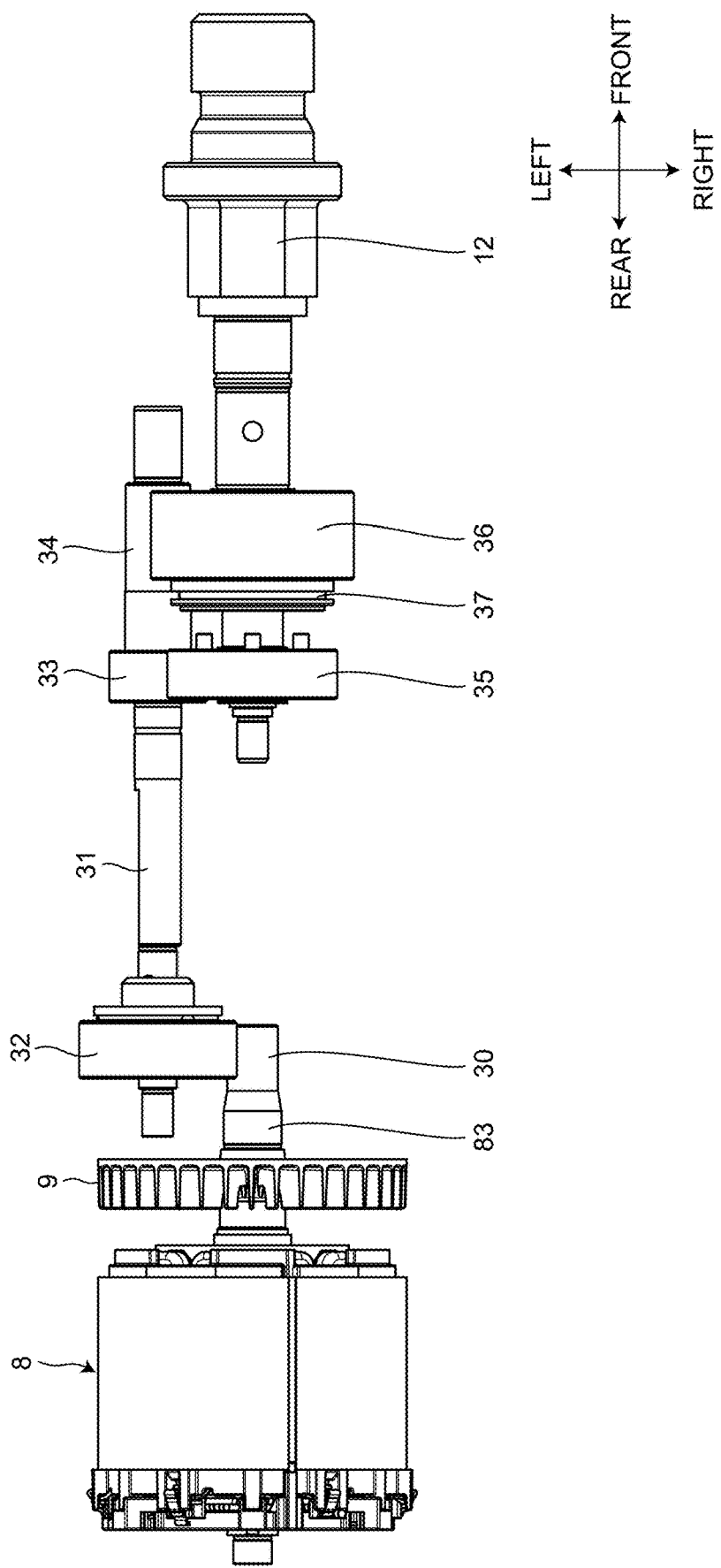
FIG. 7 is a drawing, viewed from above, of a speed-reducing mechanism according to the first embodiment.

FIG. 7 is a drawing, viewed from above, of the speed-reducing mechanism 11 according to the present embodiment. The speed-reducing mechanism 11 comprises: an intermediate shaft 31; a gear 32, which is fixed to a rear portion of the intermediate shaft 31; a gear 33, which is fixed to a front portion of the intermediate shaft 31; and a gear 34, which is fixed to the intermediate shaft 31 more on the front side than the gear 33. In addition, the speed-reducing mechanism 11 comprises a gear 35, which is fixed to a rear portion of the spindle 12, and a gear 36, which is supported (held) on the spindle 12 forward of the gear 35. The intermediate shaft 31 is disposed leftward of the rotor shaft 83 and the spindle 12. The gear 30 and the gear 32 mesh with each other. The gear 33 and the gear 35 can mesh with each other. The gear 34 and the gear 36 can mesh with each other.

When the rotor shaft 83 rotates, the intermediate shaft 31, which is coupled to the rotor shaft 83 via the gear 30 and the gear 32, rotates. When the intermediate shaft 31 rotates, the spindle 12, which is coupled to the intermediate shaft 31 via the gears 33, 35 and the gears 34, 36, rotates.

The speed-reduction ratio of the speed-reducing mechanism 11 is changeable. By manipulating a speed-changing lever 17, which is provided at a lower portion of the gear housing 5, the speed-reduction ratio of the speed-reducing mechanism 11 can be changed. By manipulating the speed-changing lever 17, a change ring 37, which is between the gear 35 and the gear 36, moves in the front-rear direction. In response to the movement of the change ring 37 in the front-rear direction, the speed-reduction ratio of the speed-reducing mechanism 11 is changed. When the speed-reduction ratio of the speed-reducing mechanism 11 is changed to a first speed-reduction ratio, the spindle 12 rotates at a first speed (low speed). More precisely, the spindle 12 rotates in a first rotational speed range in response to rotation of the rotor shaft 83. When the speed-reduction ratio of the speed-reducing mechanism 11 is changed to a second speed-reduction ratio, the spindle 12 rotates at a second speed (high speed), which is higher than the first speed. More precisely, the spindle 12 rotates in a second rotational speed range in response to rotation of the rotor shaft 83 and the maximum rotational speed of the second rotational speed range is greater than the maximum rotational speed of the first rotational speed range. In the explanation below, the state in which the speed-reduction ratio of the speed-reducing mechanism 11 is the first speed-reduction ratio is called the low-speed mode as appropriate, and the state in which the speed-reduction ratio of the speed-reducing mechanism 11 is the second speed-reduction ratio is called the high-speed mode as appropriate.

The spindle 12 is an output shaft that, in the state in which the core bit is mounted on the spindle 12, is rotated by the rotational force of the rotor 82 transmitted via the speed-reducing mechanism 11. The spindle 12 is disposed more forward than the rotor shaft 83. At least a portion of the spindle 12 is disposed more forward than the speed-reducing mechanism 11. Preferably, motor rotational axis MX is colinear or parallel to the spindle (output shaft) 12 and intersects the grip part 24. Motor rotational axis MX also preferably intersects the trigger lever 13.

The spindle 12 is capable of rotating about output rotational axis AX, which extends in the front-rear direction. Output rotational axis AX and motor rotational axis MX do not have to coincide with each other. In the embodiment, output rotational axis AX and motor rotational axis MX are parallel to each other, but in other embodiments of the present teachings output rotational axis AX and motor rotational axis MX may be oblique, e.g., perpendicular, to each other. The spindle 12 is supported by both a spindle bearing 53 and a spindle bearing 54 in a rotatable manner. The spindle bearing 53 is held by the gear housing 5. The spindle bearing 54 is held by the gear case 4.

Figure 8:
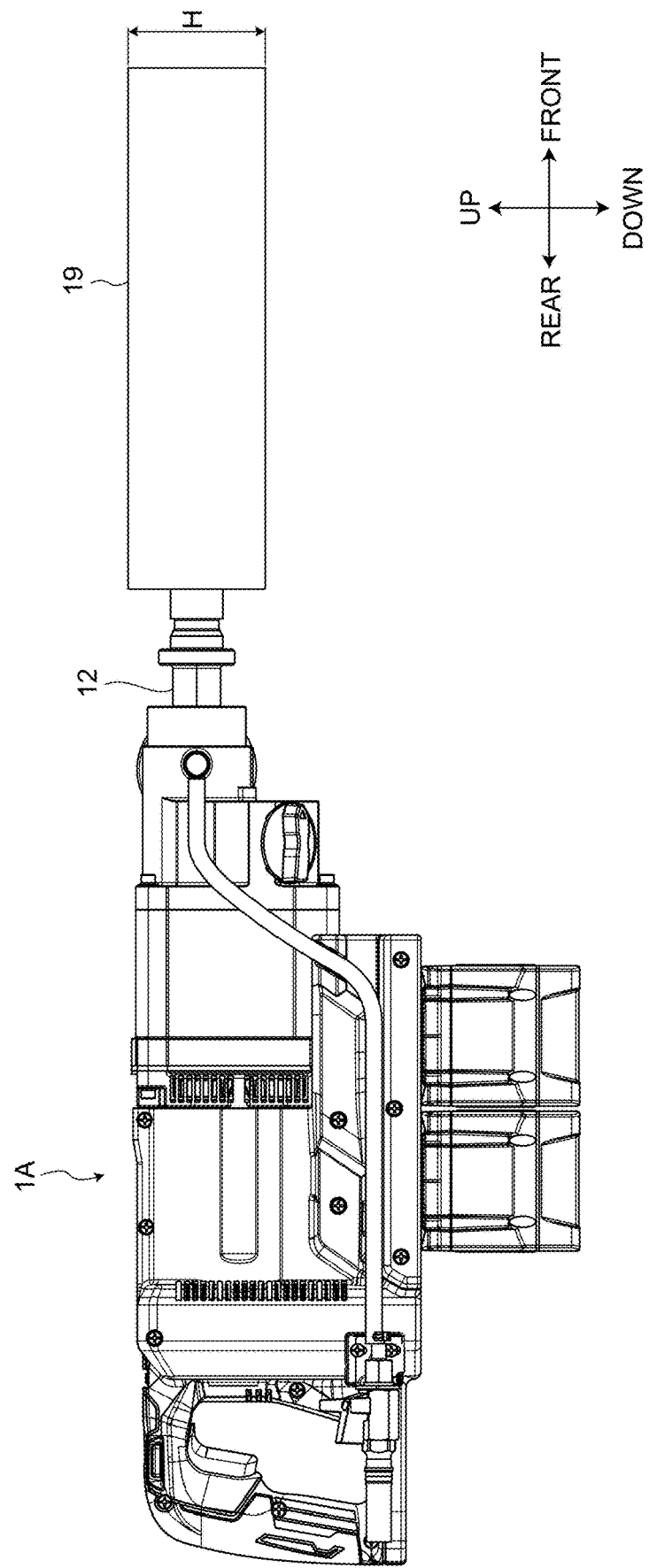
FIG. 8 shows the state in which a core bit is mounted on a spindle of the core drill according to the first embodiment.

FIG. 8 shows the state in which a core bit 19 is mounted on the spindle 12 of the core drill 1A according to the present embodiment. When the spindle 12 is rotated by the rotational force generated by the motor 8, the core bit 19, which is mounted on a front-end portion of the spindle 12, rotates together with the spindle 12.

The trigger lever 13 is manipulated (e.g., squeezed or pulled) by the user in order to drive (energize) the motor 8. The trigger lever 13 protrudes forward from a front portion of an upper portion of the rear-grip part 24C. A trigger switch 18 is disposed in the interior of the rear-grip part 24C. The trigger lever 13 is manipulated by the user so as to move the trigger lever 13 rearward. By manipulating the trigger lever 13 such that it moves rearward, a manipulation signal for driving the motor 8 is transmitted from the trigger switch 18 to the controller 10. Based on the manipulation signal from the trigger switch 18, the controller 10 supplies to the motor 8 a drive current (preferably a pulse-width modulated (PWM) current) for driving the motor 8. By releasing the manipulation of the trigger lever 13, the drive of the motor 8 stops.

The water-supply tube 14 supplies water to the core bit 19. The water-supply tube 14 is connected to the gear housing 5. The water supplied from the water-supply tube 14 to the interior of the gear housing 5 passes through the interior of the spindle 12 and then is supplied to the core bit 19.

Specifications

As shown in FIG. 6, stator outer diameter D, which is the outer diameter of the stator core 84, is 75 mm or more. Stator outer diameter D is the dimension of the stator core 84 in a direction orthogonal to motor rotational axis MX. The upper-limit value of stator outer diameter D is not particularly limited and may be 120 mm. That is, stator outer diameter D may be 75 mm or more and 120 mm or less. It is noted that stator outer diameter D may be 80 mm or more, may be 85 mm or more, may be 90 mm or more, may be 95 mm or more, may be 100 mm or more, may be 105 mm or more, or may be 110 mm or more. Suitable ranges for the stator outer diameter D may be selected by using any of the preceding upper or lower limits to define a plurality of different diameter ranges. In the present embodiment, stator outer diameter D is 80 mm.

Stator length L, which is the dimension of the stator core 84 in the axial direction, is 30 mm or more. Stator length L is the dimension of the stator core 84 in a direction parallel to motor rotational axis MX. The upper-limit value of stator length L is not particularly limited and may be 65 mm. That is, stator length L may be 30 mm or more and 65 mm or less. It is noted that stator length L may be 35 mm or more, may be 40 mm or more, may be 45 mm or more, may be 50 mm or more, or may be 55 mm or more. Suitable ranges for the stator length L may be selected by using any of the preceding upper or lower limits to define a plurality of different length ranges. In the present embodiment, stator length L is 50 mm.

As shown in FIG. 8, hole-drilling diameter H, which is the outer diameter of a tip portion (front-end portion) of the core bit 19, is 155 mm or more. The upper-limit value of hole-drilling diameter H is not particularly limited and may be 200 mm. That is, hole-drilling diameter H may be 155 mm or more and 200 mm or less. It is noted that hole-drilling diameter H may be 160 mm or more, may be 165 mm or more, may be 170 mm or more, may be 175 mm or more, may be 180 mm or more, may be 185 mm or more, or may be 190 mm or more. Suitable ranges for the hole-drilling diameter H may be selected by using any of the preceding upper or lower limits to define a plurality of different diameter ranges. In the present embodiment, hole-drilling diameter H is 160 mm.

The speed-reduction ratio of the speed-reducing mechanism 11 may be 1/16 or more and 1/5 or less. For example, the first speed-reduction ratio of the speed-reducing mechanism 11 in the low-speed mode may be 1/16 or more and 1/12 or less. The second speed-reduction ratio of the speed-reducing mechanism 11 in the high-speed mode may be 1/9 or more and 1/5 or less. Suitable ranges for the speed-reduction ratio may be selected by using any of the preceding upper or lower limits to define a plurality of different speed-reduction ratio ranges. In the present embodiment, the first speed-reduction ratio of the speed-reducing mechanism 11 in the low-speed mode is 1/14, and the second speed-reduction ratio of the speed-reducing mechanism 11 in the high-speed mode is 1/7.

The motor output, which is the output of the motor 8, is 1,800 W or more and 3,000 W or less.

The total (combined) rated voltage of the two battery packs 15 is 72 V or more (more preferably, a maximum total rated voltage of 80 V or more). As described above, both the first battery-mounting part 71 and the second battery-mounting part 72 are disposed on the battery-connection part 22. The first battery pack 151 is mounted on the first battery-mounting part 71, and the second battery pack 152 is mounted on the second battery-mounting part 72. The rated voltage of the first battery pack 151 and the rated voltage of the second battery pack 152 are preferably equal to each other, although the battery packs 151, 152 may have different voltages or different rated capacities in other embodiments of the present teachings. The outer shape and the dimensions of the first battery pack 151 are the same as the outer shape and the dimensions of the second battery pack 152, respectively. That is, the first battery pack 151 and the second battery pack 152 are preferably the same type. The first battery pack 151 and the second battery pack 152 are preferably electrically connected in series, although they may be connected in parallel in other embodiments of the present teachings. The rated voltage of each of the first battery pack 151 and the rated voltage of the second battery pack 152 is 36 V or more (maximum of 40 V or more). That is, at least two of the battery packs 15, each having a rated voltage of 36 V or more (maximum of 40 V or more), are mounted on the core drill 1A such that the sum total of the rated voltages of the battery packs 15 becomes 72 V or more (maximum of 80 V or more).

Effects

As explained above, in the present embodiment, the core drill 1A may comprise: the motor 8 comprising the stator 81 and the rotor 82, which rotates relative to the stator 81; the speed-reducing mechanism 11; the spindle 12, which is the output shaft that, in the state in which the core bit 19 is mounted, is rotated by the rotational force of the rotor 82 transmitted via the speed-reducing mechanism 11; and the battery-mounting part 7, on which the battery pack 15 is mounted. Stator outer diameter D, which is the outer diameter of the stator core 84 of the stator 81, may be 75 mm or more. Stator length L, which is the dimension of the stator core 84 in the axial direction, may be 30 mm or more.

In the above-mentioned configuration, because the volume of the stator core 84 is increased and the heat capacity of the stator core 84 is also increased, the generation of heat by the motor 8 is curtailed. In addition, because stator outer diameter D is large, the motor 8 can be designed as a high torque motor.

In the present embodiment, stator outer diameter D may be 120 mm.

According to the above-mentioned configuration, an excessive increase in the size and weight of the motor 8 is prevented. The user can use the core drill 1A by holding it in their hand.

In the present embodiment, stator length L may be 65 mm or less.

According to the above-mentioned configuration, an excessive increase in the size and weight of the motor 8 is prevented. The user can use the core drill 1A by holding it in their hand.

In the present embodiment, hole-drilling diameter H, which is the outer diameter of a tip portion of the core bit 19, may be 155 mm or more.

According to the above-mentioned configuration, because the motor 8 can be designed as a high torque motor, a large-diameter hole can be drilled.

In the present embodiment, hole-drilling diameter H may be 200 mm or less.

According to the above-mentioned configuration, an excessive increase in the size and weight of the core bit 19 is prevented. The user can use the core drill 1A by holding it in their hand.

In the present embodiment, the speed-reduction ratio of the speed-reducing mechanism 11 may be 1/16 or more and 1/5 or less.

According to the above-mentioned configuration, because the rotational force of the rotor 82 can be converted into higher torque by the speed-reducing mechanism 11, the spindle 12 can be rotated with high torque.

In the present embodiment, the output power rating of the motor 8 may be 1,800 W or more and 3,000 W or less.

According to the above-mentioned configuration, the motor 8 can be made high torque while the electric-power consumption of the motor 8 can be curtailed.

In the present embodiment, the rated voltage of the battery pack 15 may be 80 V or more.

According to the above-mentioned configuration, the motor 8 can be driven with high torque.

In the present embodiment, the battery-mounting parts 7 may include the first battery-mounting part 71 and the second battery-mounting part 72, which is electrically connected in series to the first battery-mounting part 71. The rated voltage of the first battery pack 151 mounted on the first battery-mounting part 71 and the rated voltage of the second battery pack 152 mounted on the second battery-mounting part 72 each may be 40 V or more.

According to the above-mentioned configuration, by using a combination of the battery packs 15, the motor 8 can be driven with high torque while avoiding the need to use a single excessively large battery pack 15 to drive the motor 8.

As explained above, in the present embodiment, the core drill 1A may comprise: the motor 8 comprising the stator 81 and the rotor 82, which rotates relative to the stator 81; the speed-reducing mechanism 11; the spindle 12, which is the output shaft that, in the state in which the core bit 19 is mounted, is rotated by the rotational force of the rotor 82 transmitted via the speed-reducing mechanism 11; the first battery-mounting part 71, on which the first battery pack 151 is mounted; and the second battery-mounting part 72, which is connected in series to the first battery-mounting part 71 and on which the second battery pack 152 is mounted. The rated voltage of the first battery pack 151 and the rated voltage of the second battery pack 152 each may be 40 V or more.

According to the above-mentioned configuration, by using a combination of the battery packs 15, it is not necessary to use a single excessively large battery pack 15, and the weight balance of the core drill 1A can be improved. In addition, because the rated voltage of the first battery pack 151 and the rated voltage of the second battery pack 152 each is 40 V or more, the motor 8 can be driven at high torque.

As explained above, in the present embodiment, the speed-reducing mechanism 11 may be disposed more forward than the stator 81. At least a portion of the spindle 12 may be disposed more forward than the speed-reducing mechanism 11. The core drill 1A may comprise: the motor-housing part 21, which houses the motor 8; and the battery-connection part 22, which is disposed on the lower side of the motor-housing part 21. The first battery-mounting part 71 and the second battery-mounting part 72 may be disposed on the battery-connection parts 22.

According to the above-mentioned configuration, the weight balance of the core drill 1A can be improved.

Second Embodiment

A second embodiment will now be explained. In the explanation below, structural elements that are identical or equivalent to those in the embodiment described above are assigned the same symbols, and explanation of those structural elements are abbreviated or omitted.

Figure 9:
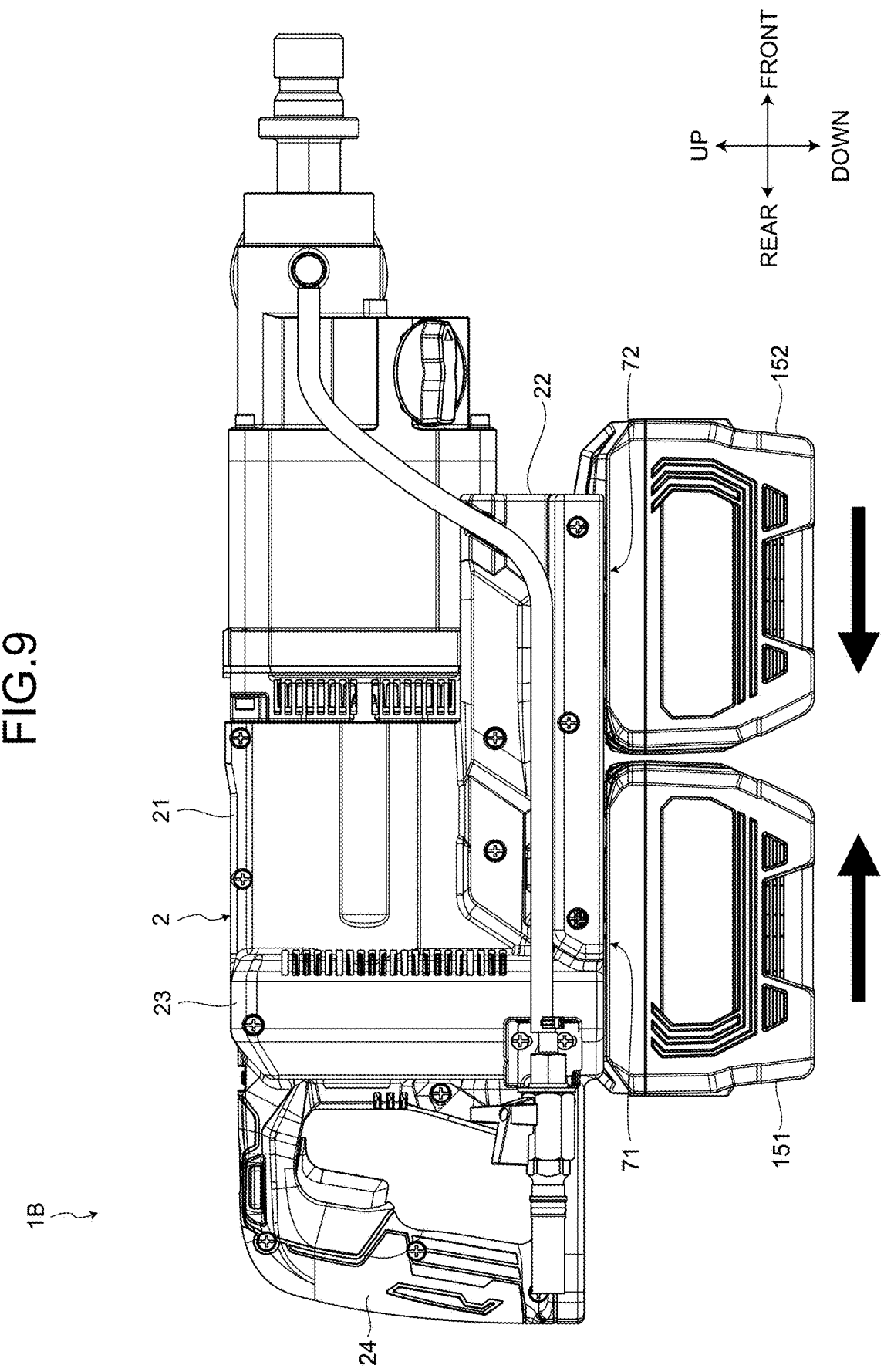
FIG. 9 is a drawing, viewed from the right, of a core drill according to a second embodiment.

FIG. 9 is a drawing, viewed from the right, of a core drill 1B according to the present (second) embodiment. In the first embodiment described above, it is assumed that the battery packs 15 are mounted on the battery-mounting parts 7 by sliding the battery packs 15 rightward from the left side of the battery-mounting parts 7. On the other hand, in the second embodiment as shown in FIG. 9, the first battery pack 151 may be mounted on the first battery-mounting part 71 by sliding the first battery pack 151 forward from the rear side of the first battery-mounting part 71. The second battery pack 152 may be mounted on the second battery-mounting part 72 by sliding the second battery pack 152 rearward from the front side of the second battery-mounting part 72. In the example shown in FIG. 9, both the first battery-mounting part 71 and the second battery-mounting part 72 are disposed on the battery-connection part 22. The first battery-mounting part 71 is disposed rearward of the second battery-mounting part 72.

It is noted that the battery-mounting parts 7 may be mounted by sliding the battery packs 15 leftward from the right sides of the battery-mounting parts 7.

Third Embodiment

A third embodiment will now be explained. In the explanation below, structural elements that are identical or equivalent to those in the embodiments described above are assigned the same symbols, and explanations of those structural elements are abbreviated or omitted.

Figure 10:
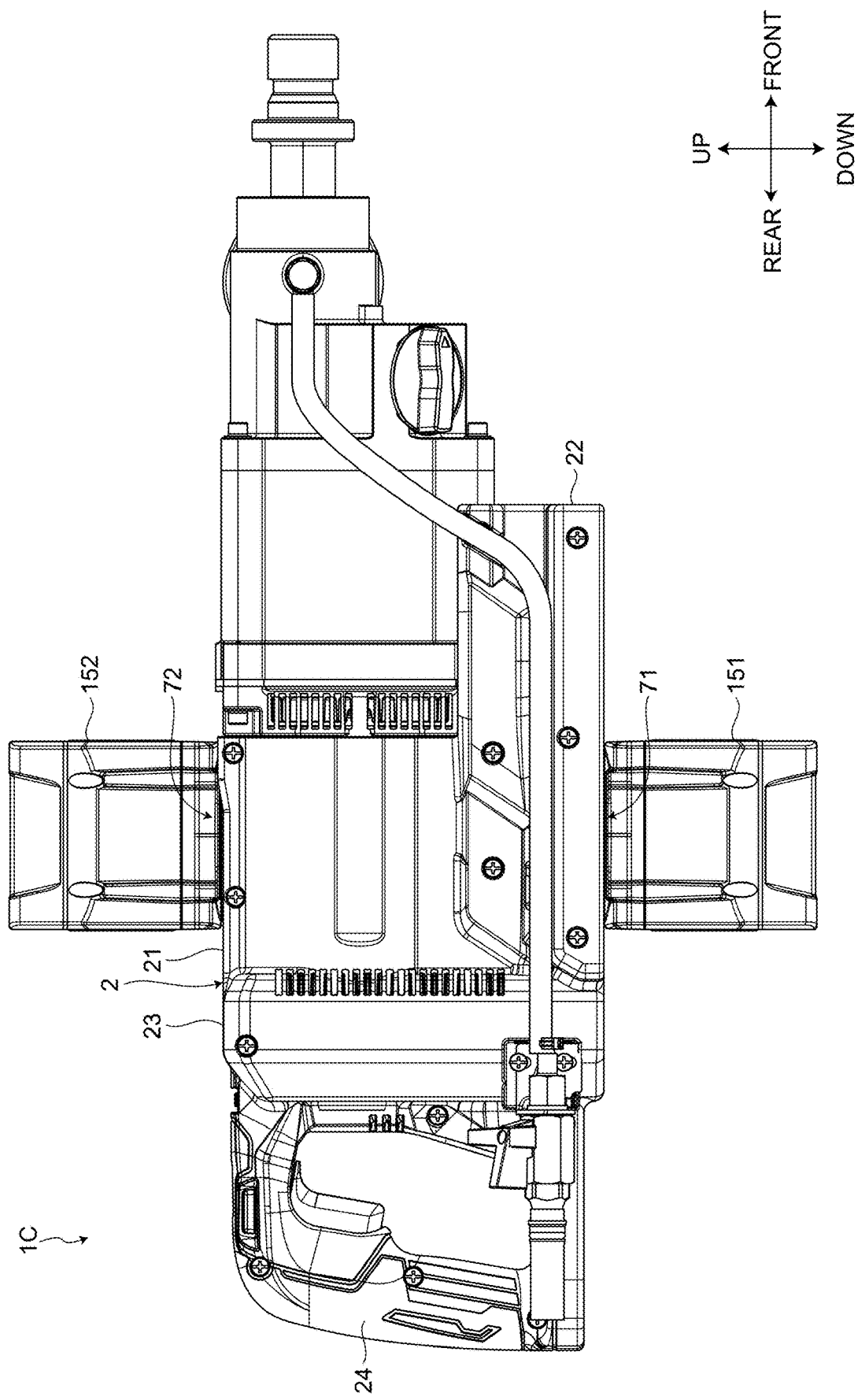
FIG. 10 is a drawing, viewed from the right, of a core drill according to a third embodiment.

FIG. 10 is a drawing, viewed from the right, of a core drill 1C according to the present (third) embodiment. As shown in FIG. 10, the first battery-mounting part 71 may be disposed on the battery-connection part 22, and the second battery-mounting part 72 may be disposed on the motor-housing part 21. In the example shown in FIG. 10, the second battery-mounting part 72 is disposed at an upper portion of the motor-housing part 21. In the example shown in FIG. 10, the first battery pack 151 is mounted on the first battery-mounting part 71 by sliding the first battery pack 151 rightward from the left side of the first battery-mounting part 71. The second battery pack 152 is mounted on the second battery-mounting part 72 by sliding the second battery pack 152 rightward from the left side of the second battery-mounting part 72.

It is noted that the first battery pack 151 may be mounted on the first battery-mounting part 71 by sliding the first battery pack 151 leftward from the right side of the first battery-mounting part 71. The first battery pack 151 may be mounted on the first battery-mounting part 71 by sliding the first battery pack 151 rearward from the front side of the first battery-mounting part 71. The first battery pack 151 may be mounted on the first battery-mounting part 71 by sliding the first battery pack 151 forward from the rear side of the first battery-mounting part 71.

It is noted that the second battery pack 152 may be mounted on the second battery-mounting part 72 by sliding the second battery pack 152 leftward from the right side of the second battery-mounting part 72. The second battery pack 152 may be mounted on the second battery-mounting part 72 by sliding the second battery pack 152 rearward from the front side of the second battery-mounting part 72. The second battery pack 152 may be mounted on the second battery-mounting part 72 by sliding the second battery pack 152 forward from the rear side of the second battery-mounting part 72.

It is noted that the second battery-mounting part 72 may be disposed at a left portion of the motor-housing part 21 or may be disposed at a right portion of the motor-housing part 21.

Fourth Embodiment

A fourth embodiment will now be explained. In the explanation below, structural elements that are identical or equivalent to those in the embodiments described above are assigned the same symbols, and explanations of those structural elements are abbreviated or omitted.

Figure 11:
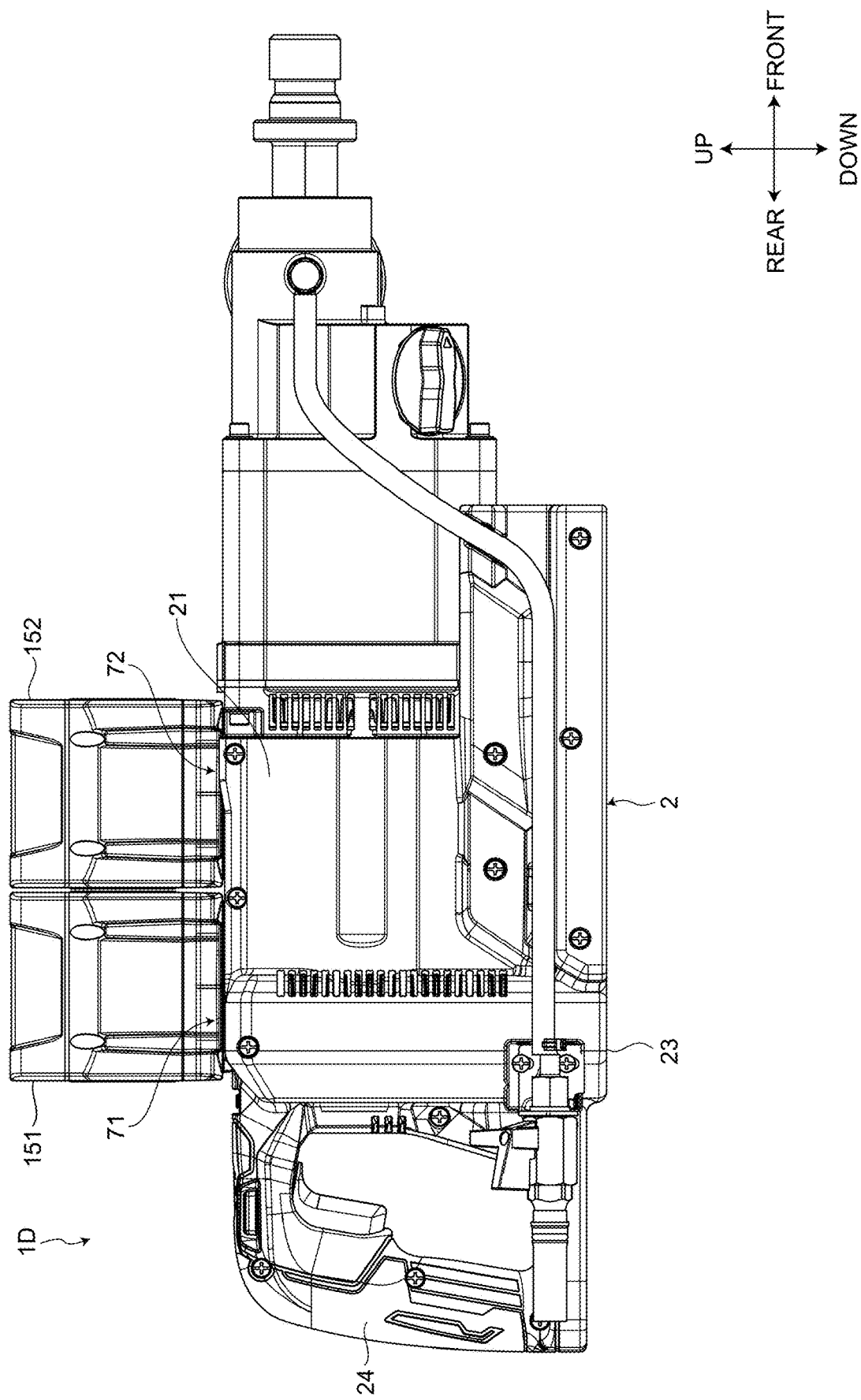
FIG. 11 is a drawing, viewed from the right, of a core drill according to a fourth embodiment.

FIG. 11 is a drawing, viewed from the right, of a core drill 1D according to the present (fourth) embodiment. As shown in FIG. 11, the first battery-mounting part 71 and the second battery-mounting part 72 each may be disposed on the motor-housing part 21. In the example shown in FIG. 11, each of the first battery-mounting part 71 and the second battery-mounting part 72 is disposed at (on) an upper portion of the motor-housing part 21. In the example shown in FIG. 11, the first battery pack 151 is mounted on the first battery-mounting part 71 by sliding the first battery pack 151 rightward from the left side of the first battery-mounting part 71. The second battery pack 152 is mounted on the second battery-mounting part 72 by sliding the second battery pack 152 rightward from the left side of the second battery-mounting part 72.

It is noted that the first battery pack 151 may be mounted on the first battery-mounting part 71 by sliding the first battery pack 151 leftward from the right side of the first battery-mounting part 71. The first battery pack 151 may be mounted on the first battery-mounting part 71 by sliding the first battery pack 151 forward from the rear side of the first battery-mounting part 71.

It is noted that the second battery pack 152 may be mounted on the second battery-mounting part 72 by sliding the second battery pack 152 leftward from the right side of the second battery-mounting part 72. The second battery pack 152 may be mounted on the second battery-mounting part 72 by sliding the second battery pack 152 rearward from the front side of the second battery-mounting part 72.

It is noted that the first battery-mounting part 71 may be disposed on the controller-housing part 23. The first battery-mounting part 71 may be disposed at, for example, an upper portion of the controller-housing part 23. It is noted that the first battery-mounting part 71 may be disposed at a left portion of the controller-housing part 23 or may be disposed at a right portion of the controller-housing part 23.

Fifth Embodiment

A fifth embodiment will now be explained. In the explanation below, structural elements that are identical or equivalent to those in the embodiments described above are assigned the same symbols, and explanations of those structural elements are abbreviated or omitted.

Figure 12:
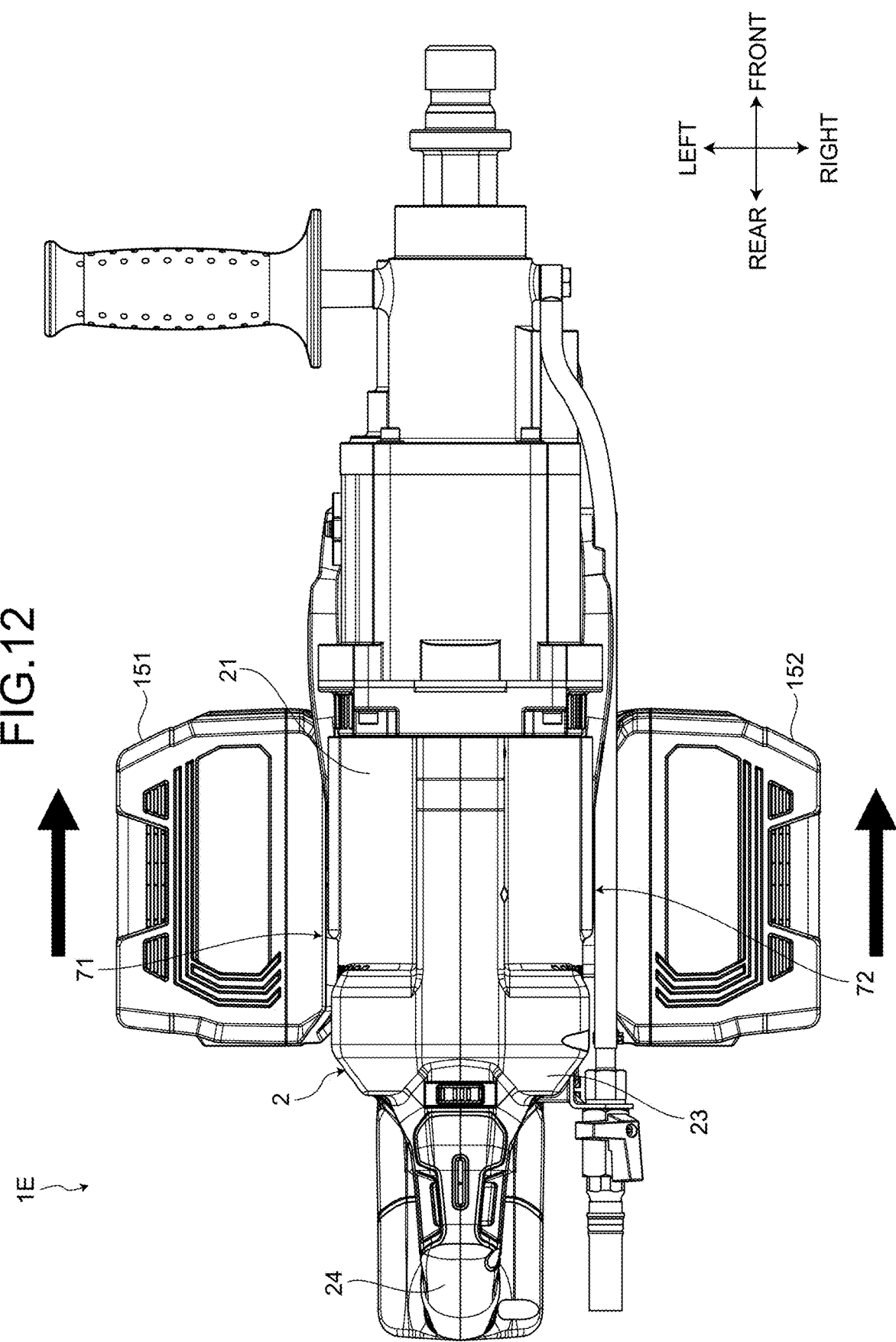
FIG. 12 is a drawing, viewed from above, of a core drill according to a fifth embodiment.

FIG. 12 is a drawing, viewed from above, of a core drill 1E according to the present (fifth) embodiment. As shown in FIG. 12, each of the first battery-mounting part 71 and the second battery-mounting part 72 may be disposed on the motor-housing part 21. In the example shown in FIG. 12, the first battery-mounting part 71 is disposed at a left portion of the motor-housing part 21, and the second battery-mounting part 72 is disposed at a right portion of the motor-housing part 21. In the example shown in FIG. 12, the first battery pack 151 is mounted on the first battery-mounting part 71 by sliding the first battery pack 151 forward from the rear side of the first battery-mounting part 71. The second battery pack 152 is mounted on the second battery-mounting part 72 by sliding the second battery pack 152 forward from the rear side of the second battery-mounting part 72.

It is noted that the first battery pack 151 may be mounted on the first battery-mounting part 71 by sliding the first battery pack 151 rearward from the front side of the first battery-mounting part 71.

It is noted that the second battery pack 152 may be mounted on the second battery-mounting part 72 by sliding the second battery pack 152 rearward from the front side of the second battery-mounting part 72.

Sixth Embodiment

A sixth embodiment will now be explained. In the explanation below, structural elements that are identical or equivalent to those in the embodiments described above are assigned the same symbols, and explanations of those structural elements are abbreviated or omitted.

Figure 13:
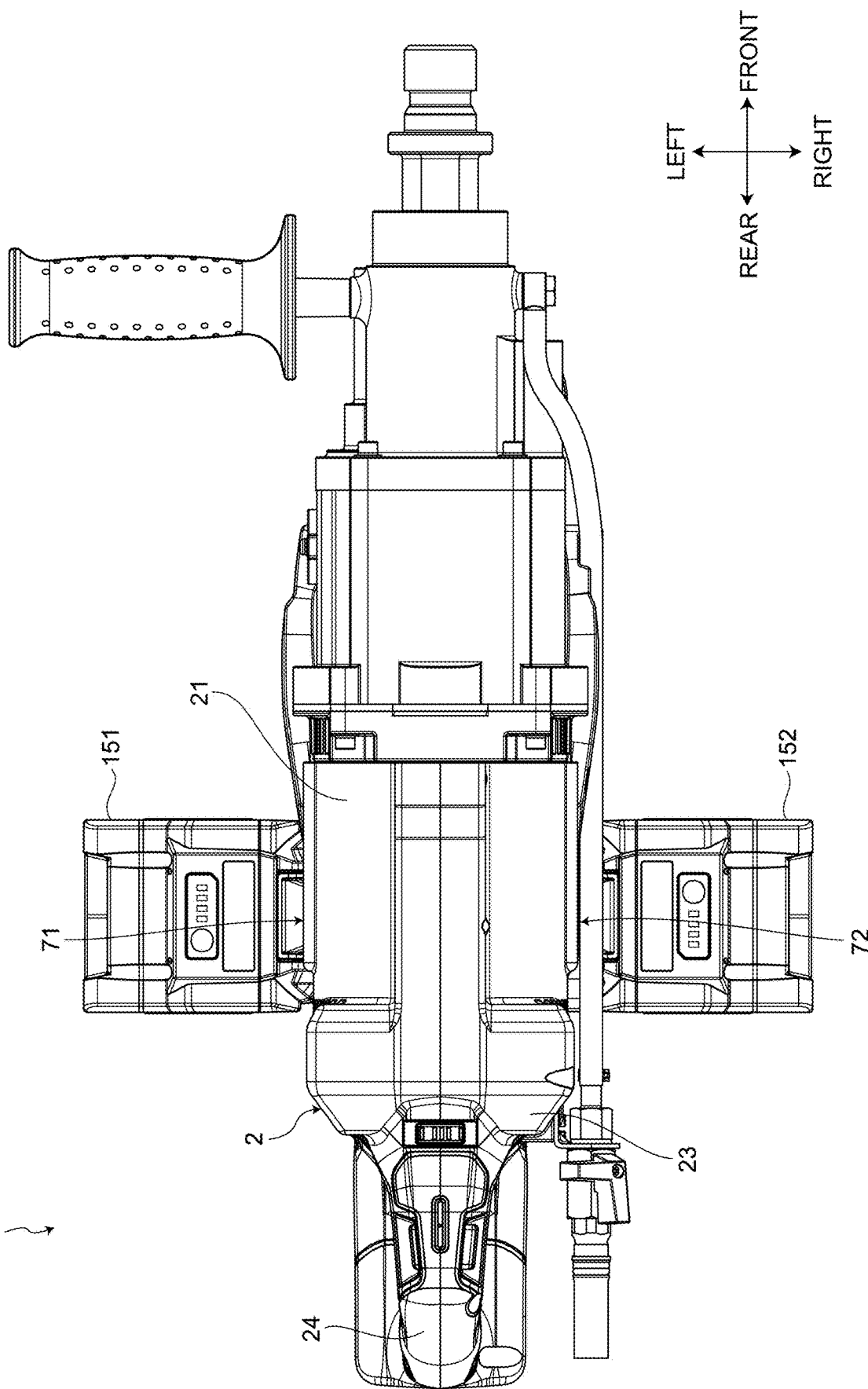
FIG. 13 is a drawing, viewed from above, of a core drill according to a sixth embodiment.

FIG. 13 is a drawing, viewed from above, of a core drill 1F according to the present (sixth) embodiment. As shown in FIG. 13, each of the first battery-mounting part 71 and the second battery-mounting part 72 may be disposed on the motor-housing part 21. In the example shown in FIG. 13, the first battery-mounting part 71 is disposed at (on) a left portion of the motor-housing part 21, and the second battery-mounting part 72 is disposed at a right portion of the motor-housing part 21. In the example shown in FIG. 13, the first battery pack 151 is mounted on the first battery-mounting part 71 by sliding the first battery pack 151 downward from the upper side of the first battery-mounting part 71. The second battery pack 152 is mounted on the second battery-mounting part 72 by sliding the second battery pack 152 downward from the upper side of the second battery-mounting part 72.

It is noted that the first battery pack 151 may be mounted on the first battery-mounting part 71 by sliding the first battery pack 151 upward from the lower side of the first battery-mounting part 71.

It is noted that the second battery pack 152 may be mounted on the second battery-mounting part 72 by sliding the second battery pack 152 upward from the lower side of the second battery-mounting part 72.

Seventh Embodiment

A seventh embodiment will now be explained. In the explanation below, structural elements that are identical or equivalent to those in the embodiments described above are assigned the same symbols, and explanations of those structural elements are abbreviated or omitted.

Figure 14:
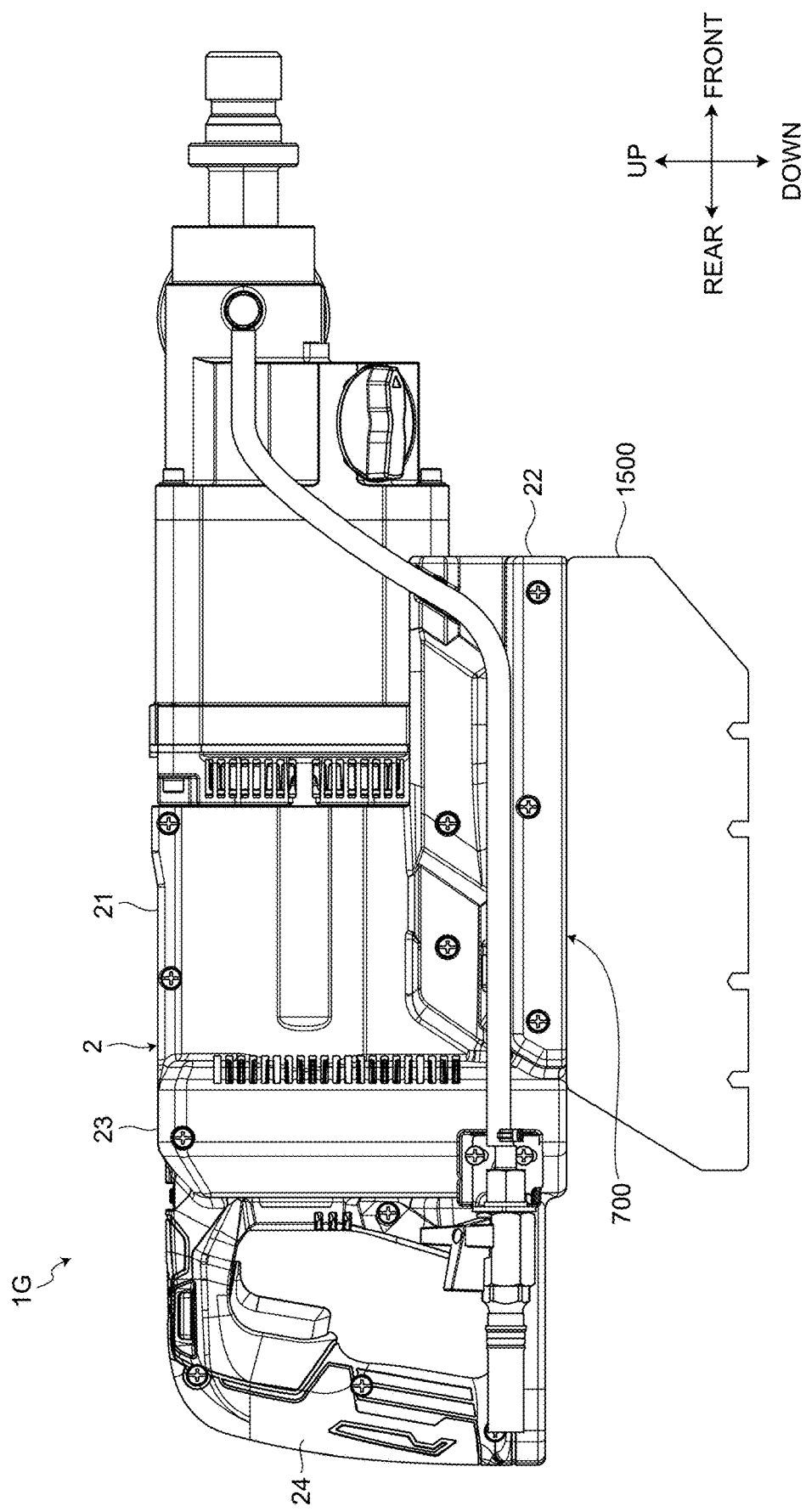
FIG. 14 is a drawing, viewed from the right, of a core drill according to a seventh embodiment.

FIG. 14 is a drawing, viewed from the right, of a core drill 1G according to the present (seventh) embodiment. As shown in FIG. 14, one (a single) battery-mounting part 700 may be provided on the battery-connection part 22. The rated voltage of a battery pack 1500, which is mounted on the battery-mounting part 700, may be 80 V or more.

Eighth Embodiment

An eighth embodiment will now be explained. In the explanation below, structural elements that are identical or equivalent to those in the embodiments described above are assigned the same symbols, and explanations of those structural elements are abbreviated or omitted.

Figure 15:
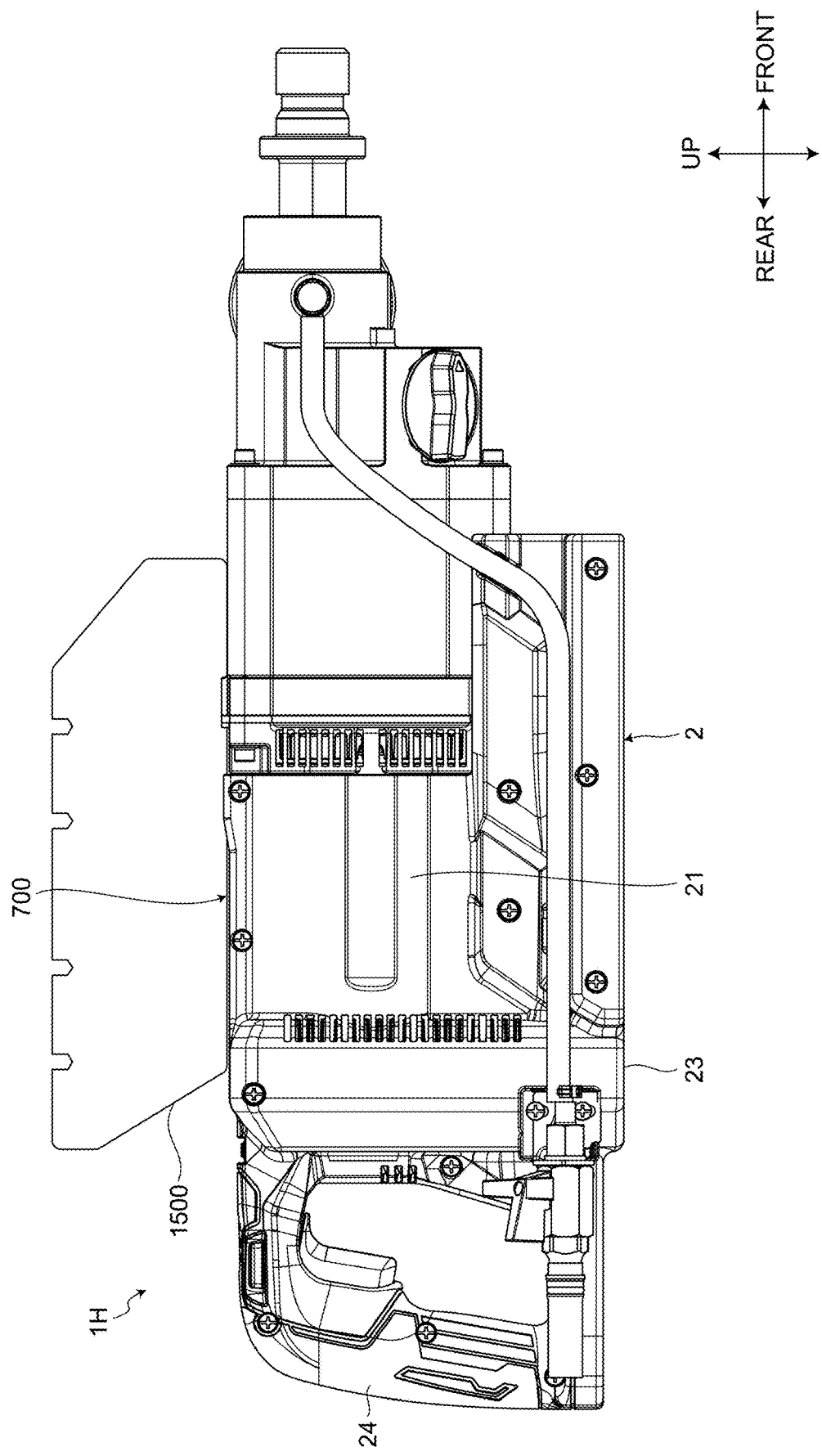
FIG. 15 is a drawing, viewed from the right, of a core drill according to an eighth embodiment.

FIG. 15 is a drawing, viewed from the right, of a core drill 1H according to the present (eighth) embodiment. As shown in FIG. 15, the battery-mounting part 700 may be disposed at (on) an upper portion of the motor-housing part 21. It is noted that the battery-mounting part 700 may be disposed at (on) a left portion of the motor-housing part 21 or may be disposed at (on) a right portion of the motor-housing part 21.

Ninth Embodiment

A ninth embodiment will now be explained. In the explanation below, structural elements that are identical or equivalent to those in the embodiments described above are assigned the same symbols, and explanations of those structural elements are abbreviated or omitted.

Figure 16:
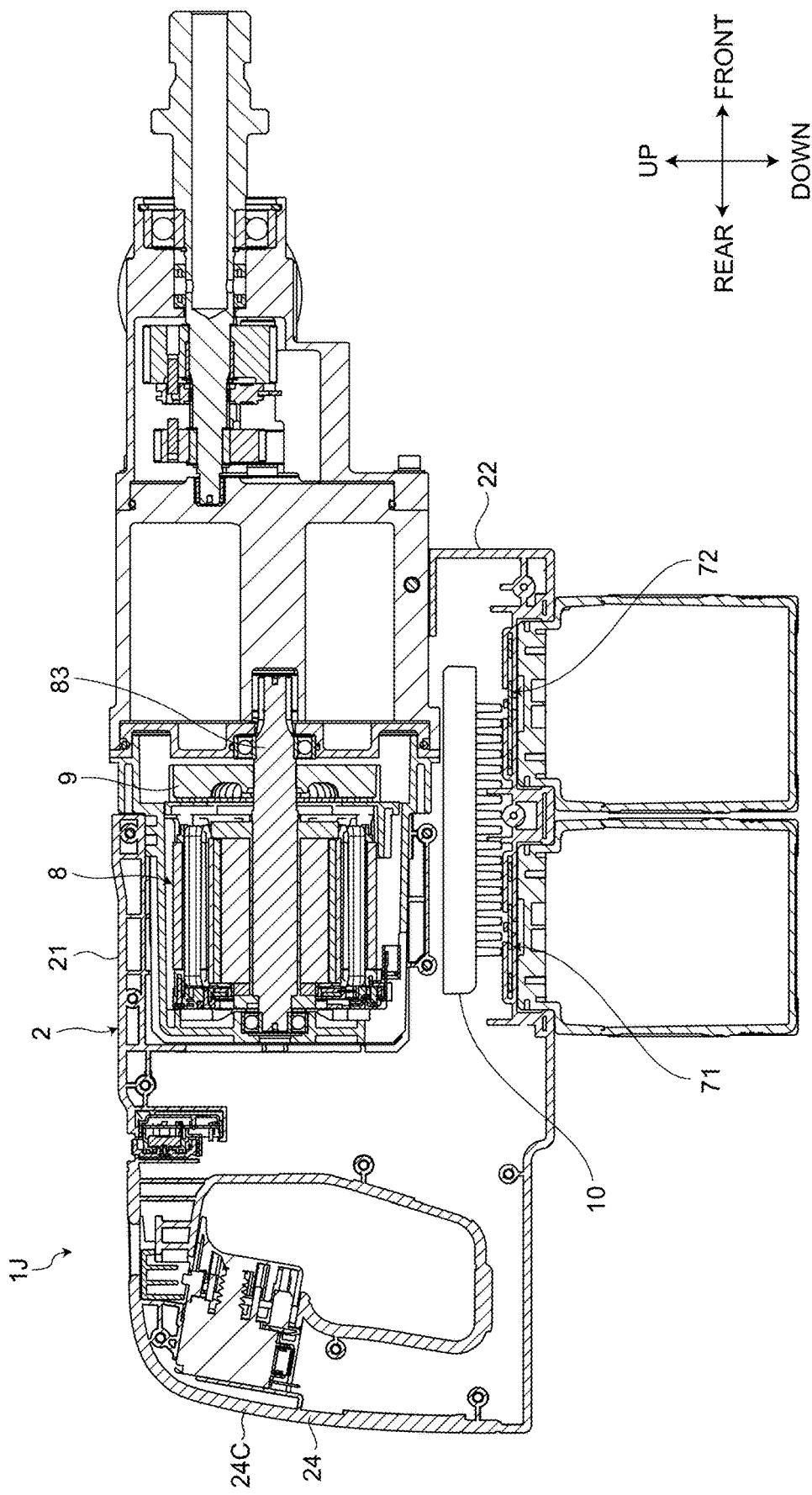
FIG. 16 is a cross-sectional view that shows a core drill according to a ninth embodiment.

FIG. 16 is a cross-sectional view that shows a core drill 1J according to the present (ninth) embodiment. In the embodiments described above, the controller 10 is disposed along the extension of motor rotational axis MX, i.e. such that motor rotational axis MX intersects the controller 10. In addition, the controller 10 is disposed on the controller-housing part 23. As shown in FIG. 16, the controller 10 may instead be disposed downward of the motor 8, i.e. such that the plane (circuit board) of the controller 10 is parallel, or at least substantially parallel, to rotor shaft 83 (motor rotational axis MX). The controller 10 may be housed in the battery-connection part 22. The air-intake ports 25 may be provided at both a left portion and a right portion of the battery-connection part 22.

Tenth Embodiment

A tenth embodiment will now be explained. In the explanation below, structural elements that are identical or equivalent to those in the embodiments described above are assigned the same symbols, and explanations of those structural elements are abbreviated or omitted.

Figure 17:
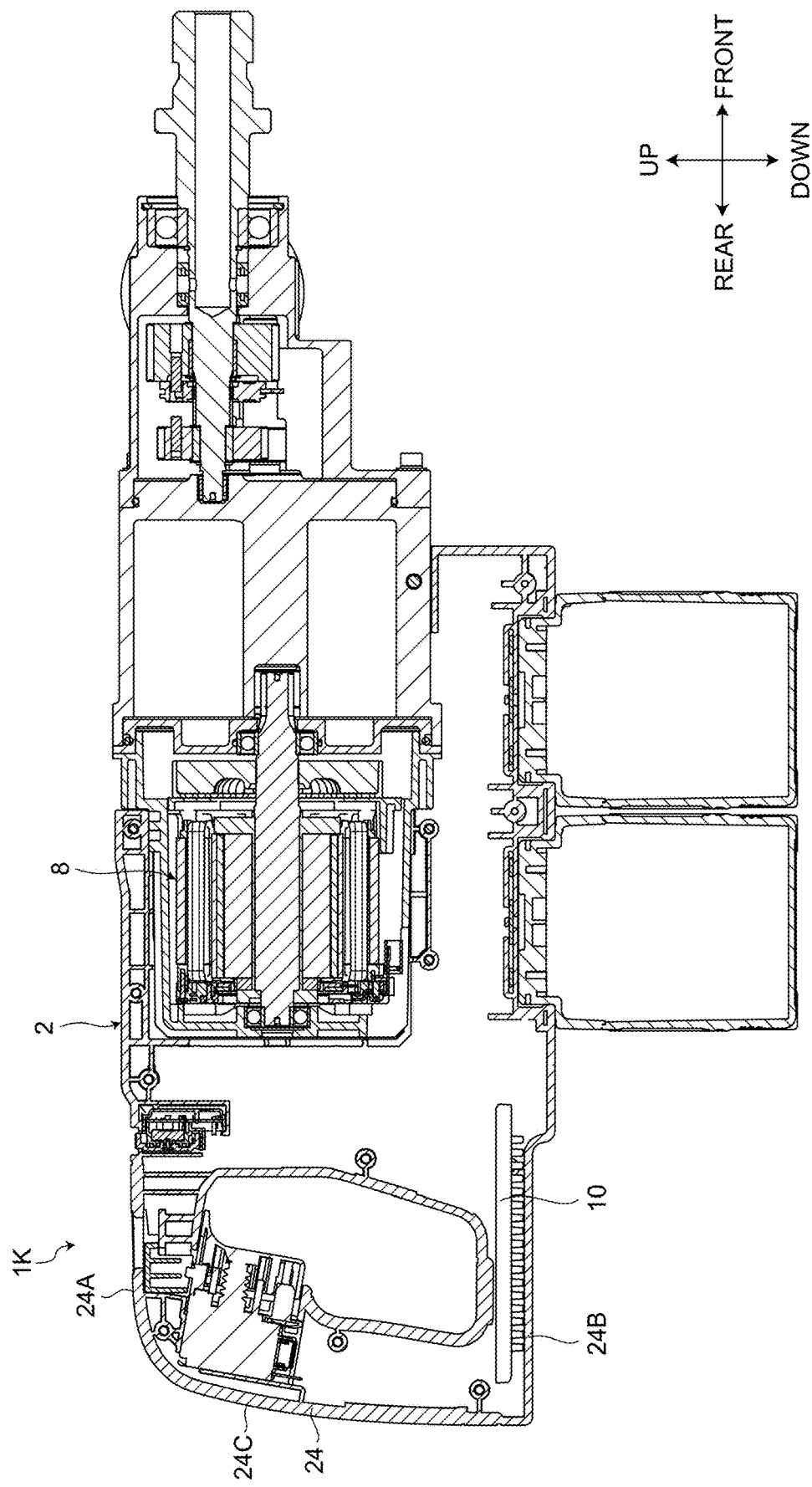
FIG. 17 is a cross-sectional view that shows a core drill according to a tenth embodiment.

FIG. 17 is a cross-sectional view that shows a core drill 1K according to the present (tenth) embodiment. As shown in FIG. 17, the controller 10 may be housed in the lower-grip part 24B of the grip part 24. The air-intake ports 25 may be provided at both a left portion and a right portion of the lower-grip part 24B. The air-intake ports 25 may be provided at a lower portion of the lower-grip part 24B.

Eleventh Embodiment

An eleventh embodiment will now be explained. In the explanation below, structural elements that are identical or equivalent to those in the embodiments described above are assigned the same symbols, and explanations of those structural elements are abbreviated or omitted.

Figure 18:
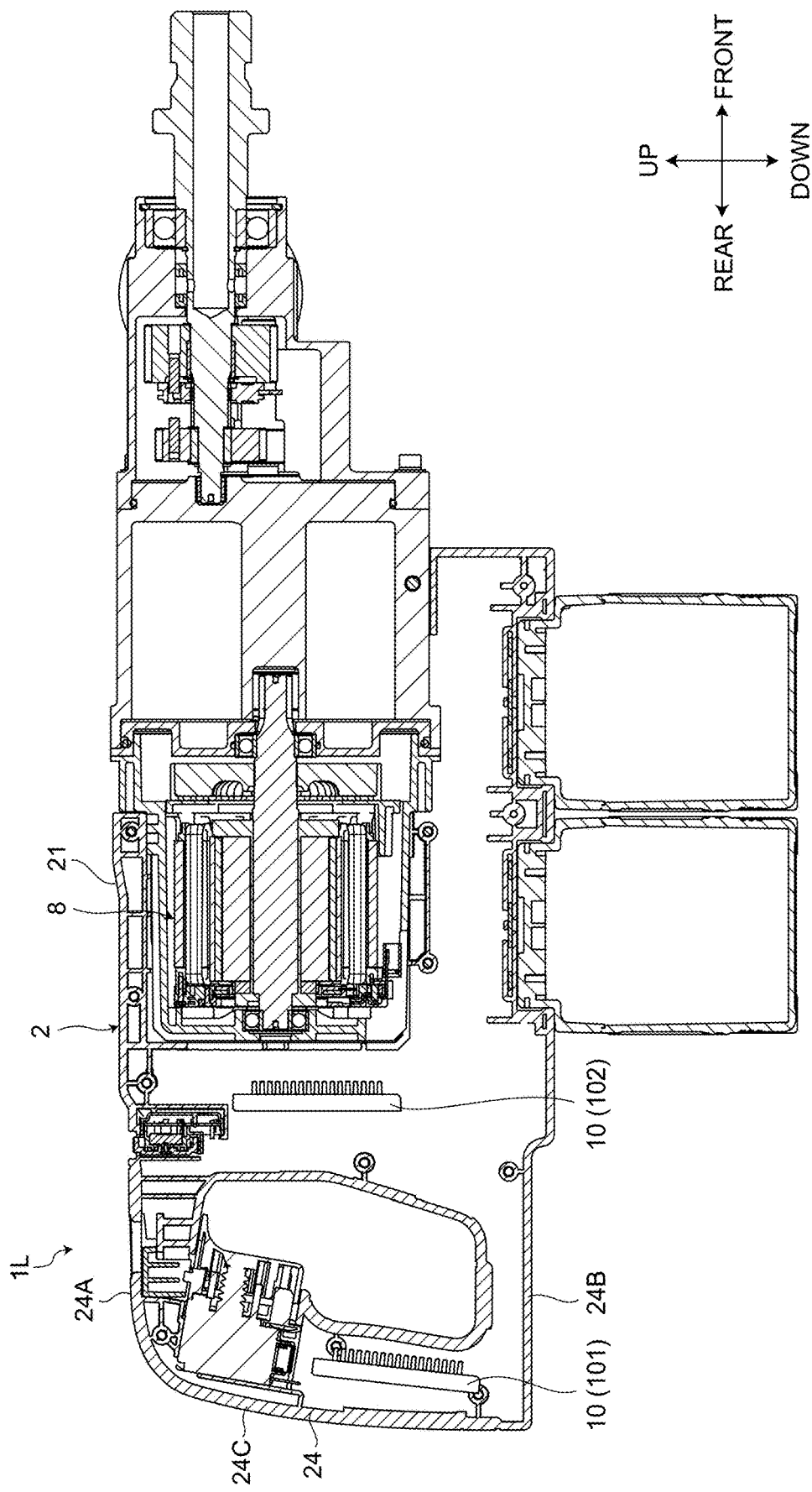
FIG. 18 is a cross-sectional view that shows a core drill according to an eleventh embodiment.

FIG. 18 is a cross-sectional view that shows a core drill 1L according to the present (eleventh) embodiment. As shown in FIG. 18, a first controller 101 and a second controller 102 are provided. The first controller 101 may be housed in the rear-grip part 24C of the grip part 24, and the second controller 102 may be disposed between the motor 8 and the grip part 24 in the front-rear direction. The second controller 102 may be housed in the controller-housing part 23. The functions of the controller 10 of the preceding embodiments may be split between the first and second controllers 101, 102.

Twelfth Embodiment

A twelfth embodiment will now be explained. In the explanation below, structural elements that are identical or equivalent to those in the embodiments described above are assigned the same symbols, and explanations of those structural elements are abbreviated or omitted.

Figure 19:
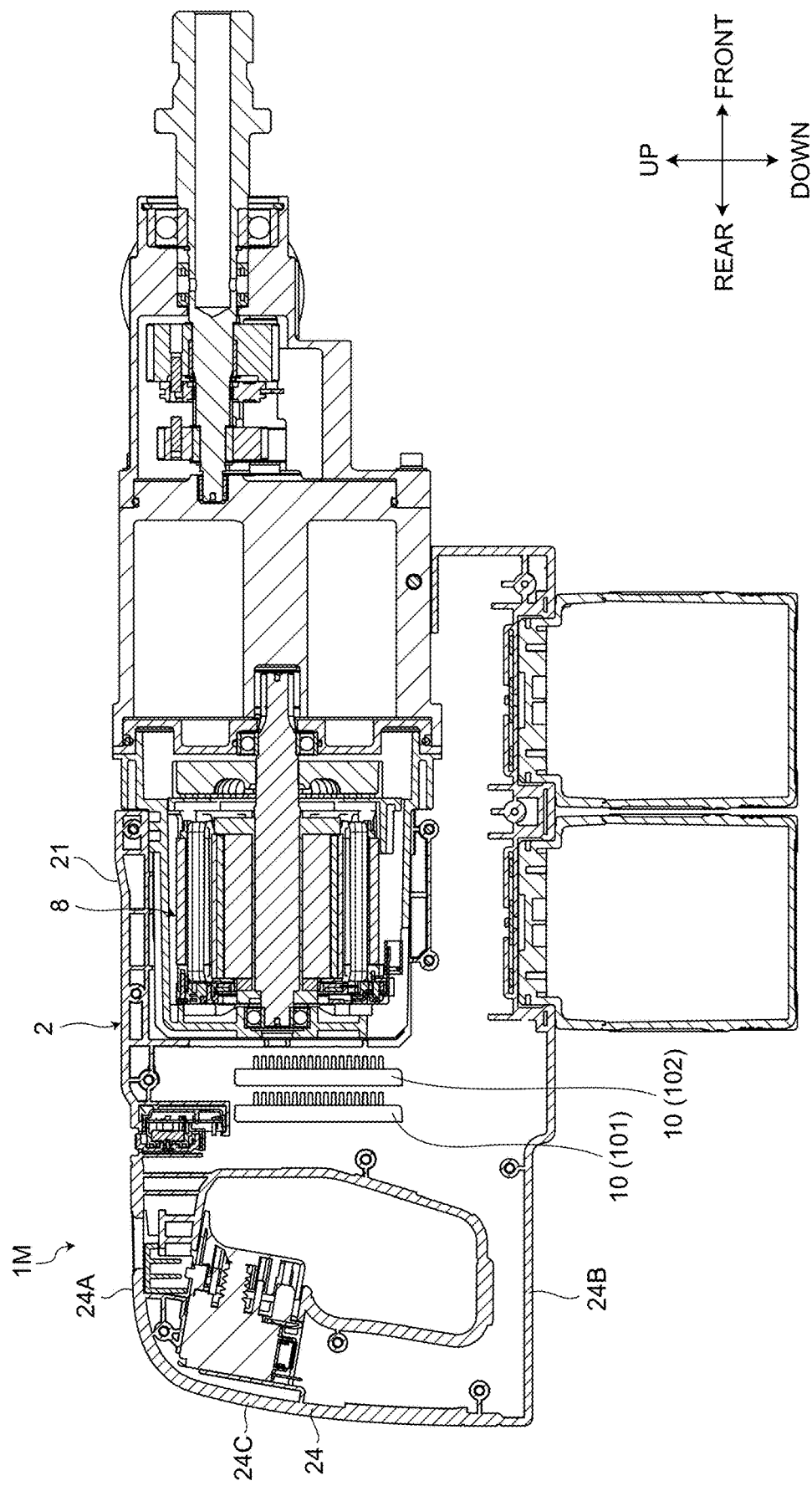
FIG. 19 is a cross-sectional view that shows a core drill according to a twelfth embodiment.

FIG. 19 is a cross-sectional view that shows a core drill 1M according to the present (twelfth) embodiment. As shown in FIG. 19, the first controller 101 and the second controller 102 are again provided. However, in this embodiment, each of the first controller 101 and the second controller 102 may be disposed between the motor 8 and the grip part 24 in the front-rear direction. The first controller 101 and the second controller 102 may be disposed in the front-rear direction in the controller-housing part 23, e.g., such that the planes (circuit boards) of the first and second controllers 101, 102 extend in parallel or substantially in parallel.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved core drills and similar power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1A Core drill
1B Core drill
1C Core drill
1D Core drill
1E Core drill
1F Core drill
1G Core drill
1H Core drill
1J Core drill 1K Core drill
1L Core drill
1M Core drill
2 Main-body housing
2L Left main-body housing
2R Right main-body housing
2S Screw
3 Motor case
4 Gear case
4S Screw
5 Gear housing
5S Screw
6 Side handle
7 Battery-mounting part
8 Motor
9 Fan
10 Controller
11 Speed-reducing mechanism
12 Spindle
13 Trigger lever
14 Water-supply tube
15 Battery pack
16 Motor bracket
17 Speed-changing lever
18 Trigger switch
19 Core bit
21 Motor-housing part
22 Battery-connection part
23 Controller-housing part
24 Grip part
24A Upper-grip part
24B Lower-grip part
24C Rear-grip part
25 Air-intake port
26 Air-exhaust port
30 Gear
31 Intermediate shaft
32 Gear
33 Gear
34 Gear
35 Gear
36 Gear
37 Change ring
51 Rotor bearing
52 Rotor bearing
53 Spindle bearing
54 Spindle bearing
71 First battery-mounting part
72 Second battery-mounting part
81 Stator
82 Rotor
83 Rotor shaft
84 Stator core
85 Insulator
86 Coil
87 Rotor core
88 Rotor magnet
89 Busbar unit
101 First controller
102 Second controller
151 First battery pack
152 Second battery pack
700 Battery-mounting part
1500 Battery pack
AX Output rotational axis
D Stator outer diameter
L Stator length
H Hole-drilling diameter
MX Motor rotational axis

The invention claimed is:

1. A core drill comprising:
a motor comprising a stator and a rotor, which is rotatable relative to the stator;
a speed-reducing mechanism;
an output shaft that, in the state in which a core bit is mounted thereon, is rotated by the rotational force of the rotor transmitted via the speed-reducing mechanism; and
at least a first battery-mounting part, on which a first battery pack is mountable;
wherein:
a stator outer diameter, which is the outer diameter of a stator core of the stator, is 75 mm or more;
a stator length, which is the dimension of the stator core in an axial direction, is 30 mm or more; and
the core bit has a hole-drilling diameter, which is the outer diameter of a tip portion of the core bit, that is 155 mm or more.

2. The core drill according to claim 1, wherein the stator outer diameter is 120 mm or less.

3. The core drill according to claim 2, wherein:
the stator length is 65 mm or less;
the speed-reducing mechanism has a speed-reduction ratio of 1/16 to 1/5;
the motor has a rated output of 1,800-3,000 W.

4. The core drill according to claim 3, further comprising:
a second battery-mounting part electrically connected in series to the first battery-mounting part, on which a second battery pack is mountable;
wherein each of the first and second battery packs has a rated voltage of 40 V or more.

5. The core drill according to claim 1, wherein the stator length is 65 mm or less.

6. The core drill according to claim 1, wherein the hole-drilling diameter is 200 mm or less.

7. The core drill according to claim 1, wherein the speed-reducing mechanism has a speed-reduction ratio of 1/16 or more and 1/5 or less.

8. The core drill according to claim 1, wherein the motor has a rated output of 1,800 W or more and 3,000 W or less.

9. The core drill according to claim 1, wherein the at least first battery pack has a rated voltage of 80 V or more.

10. The core drill according to claim 1, further comprising:
a second battery-mounting part electrically connected in series to the first battery-mounting part, on which a second battery pack is mountable;
wherein each of the first and second battery packs has a rated voltage of 40 V or more.

11. A core drill comprising:
a motor comprising a stator and a rotor, which is rotatable relative to the stator;
a motor-housing part that houses the motor;
a speed-reducing mechanism disposed more forward than the stator;
an output shaft that, in the state in which a core bit is mounted thereon, is rotated by the rotational force of the rotor transmitted via the speed-reducing mechanism;
a grip part configured to be gripped by a user, the grip part being disposed more rearward than the motor-housing part;
a trigger lever configured to control operation of the motor, the trigger lever being disposed on the grip part;

a first battery-mounting part, on which a first battery pack is mountable; and a second battery-mounting part, which is connected in series to the first battery-mounting part and on which a second battery pack is mountable;

wherein:

at least a portion of the output shaft is disposed more forward than the speed-reducing mechanism; and the first battery-mounting part and the second battery-mounting part are disposed more forward than the trigger lever.

12. The core drill according to claim 11, wherein:
a battery-connection part is disposed on the lower side of the motor-housing part; and
the first battery-mounting part and the second battery-mounting part are disposed on the battery-connection part.

13. The core drill according to claim 11, wherein:
a battery-connection part is disposed on a lower side of the motor-housing part;
the first battery-mounting part is disposed on the battery-connection part; and
the second battery-mounting part is disposed in the motor-housing part.

14. The core drill according to claim 13, wherein the second battery-mounting part is disposed on an upper portion of the motor-housing part.

15. The core drill according to claim 11, wherein:
a battery-connection part is disposed on a lower side of the motor-housing part; and
the first battery-mounting part and the second battery-mounting part are both disposed on the motor-housing part.

16. The core drill according to claim 15, wherein:
the first battery-mounting part is disposed on a left portion of the motor-housing part; and
the second battery-mounting part is disposed on a right portion of the motor-housing part.

17. The core drill according to claim 11, wherein:
a controller is disposed more rearward than the motor and controls the motor;
a controller-housing part is disposed between the motor-housing part and the grip part, the controller-housing part housing the controller;
the first battery-mounting part is disposed on the controller-housing part; and
the second battery-mounting part is disposed on the motor-housing part.

18. The core drill according to claim 11, wherein each of the first battery pack and the second battery pack has a rated voltage of 40 V or more.

19. The core drill according to claim 11, wherein the second battery-mounting part is disposed on an upper portion of the motor-housing part.

20. A core drill comprising:
a motor comprising a stator and a rotor, which is rotatable relative to the stator;
a speed-reducing mechanism;
an output shaft configured to be rotated by the rotational force of the rotor transmitted via the speed-reducing mechanism;
a core bit that is mountable on the output shaft, the core bit having a hole-drilling diameter, which is the outer diameter of a tip portion of the core bit, that is 155 mm or more; and
at least a first battery-mounting part, on which a first battery pack is mountable;

wherein:

a stator core of the stator has an outer diameter that is 75 mm or more; and
the stator core has a length in an axial direction that is 30 mm or more.

* * * * *